US011977323B2

(12) United States Patent
Matsuba

(10) Patent No.: US 11,977,323 B2
(45) Date of Patent: May 7, 2024

(54) OPTICAL SYSTEM AND IMAGE PICKUP APPARATUS HAVING THE SAME

(71) Applicant: CANON KABUSHIKI KAISHA, Tokyo (JP)

(72) Inventor: Yuki Matsuba, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 198 days.

(21) Appl. No.: 17/524,642

(22) Filed: Nov. 11, 2021

(65) Prior Publication Data

US 2022/0155653 A1 May 19, 2022

(30) Foreign Application Priority Data

Nov. 18, 2020 (JP) ................................ 2020-191461

(51) Int. Cl.

*G03B 5/04* (2021.01)
*G02B 27/00* (2006.01)
*G02B 27/64* (2006.01)

(52) U.S. Cl.

CPC .......... *G03B 5/04* (2013.01); *G02B 27/0068* (2013.01); *G02B 27/646* (2013.01); *G03B 2205/0015* (2013.01)

(58) Field of Classification Search

CPC ............. G03B 5/04; G03B 2205/0015; G02B 27/0068; G02B 27/646

See application file for complete search history.

(56) References Cited

U.S. PATENT DOCUMENTS

| | | | | |
|---|---|---|---|---|
| 5,760,957 A * | 6/1998 | Suzuki | G02B 27/646 | 359/557 |
| 2003/0103266 A1* | 6/2003 | Wada | G02B 13/16 | 359/649 |
| 2013/0321689 A1* | 12/2013 | Toyoda | G02B 27/646 | 359/683 |
| 2017/0254991 A1* | 9/2017 | Gyoda | G02B 15/16 | |

FOREIGN PATENT DOCUMENTS

JP 2019090952 A 6/2019

OTHER PUBLICATIONS

Machine translation of JP 201909095, retrieved electronically from Espacenet Sep. 18, 2023 (Year: 2023).*

Kingslake et al. Chapter 11 "Oblique Aberrations" in Lens Design Fundamentals (Second Edition), 2010, Elsevier Inc. pp. 297-305 DOI:10.1016/B978-0-12-374301-5.00015-2 (Year: 2010).*

* cited by examiner

*Primary Examiner* — Cara E Rakowski
(74) *Attorney, Agent, or Firm* — CANON U.S.A., INC. IP Division

(57) ABSTRACT

An optical system includes first and second lens units configured to move to have a component of direction perpendicular to an optical axis, in which a sign of an amount of movement of the lens units is defined as negative for a moving direction of the first lens unit and as positive for an opposite direction to the moving direction of the first lens unit, a product of an amount of movement and a focal length of the first lens unit and a product of an amount of movement and a focal length of the second lens unit are different from each other in sign, and Petzval sums of the first and second lens unit, a focal length of the optical system, and a back focus of the optical system are set.

19 Claims, 23 Drawing Sheets

OPTICAL SYSTEM AND IMAGE PICKUP APPARATUS HAVING THE SAME

BACKGROUND OF THE DISCLOSURE

Field of the Disclosure

The aspect of the embodiments relates to an optical system and an image pickup apparatus.

Description of the Related Art

An image pickup optical system that can obtain a totally good focus on an object plane leaning in the optical axis direction of image pickup optical system is in demand.

Such image pickup is called a tilt image pickup, and an image pickup optical system provided with a tilt mechanism is known to satisfy such demand. Sheimpflug principle is applied to the tilt image pickup, and the image pickup optical system is also called Sheimpflug optical system.

On the other hand, in the case of image pickup optical system having the tilt mechanism, the composition is shifted (hereinafter also referred to as "composition shift") when the tilt is performed, which sometimes impairs convenience.

On the other hand, an image pickup optical system is known which is provided with a plurality of lens parts configured to move with a component perpendicular to the optical axis direction (Japanese Patent Application Laid-Open No. 2019-090952). Japanese Patent Application Laid-Open No. 2019-090952 discloses a lens part A for generating a tilt effect by moving with a component of direction perpendicular to the optical axis direction and a lens part B for generating a shift effect (composition shift) by moving with a component of direction perpendicular to the optical axis direction.

In Japanese Patent Application Laid-Open No. 2019-090952, when performing the tilt image pickup, the lens part A moves in a vertical direction with respect to the optical axis direction, and the lens part B moves in a vertical direction with respect to the optical axis direction so as to correct the shift effect generated by the lens part A, thereby enabling a tilt image pickup with a small composition shift.

In an image pickup optical system provided with a plurality of lens parts each of which moves in a vertical direction to an optical axis direction as disclosed in Japanese Patent Application Laid-Open No. 2019-090952, since the lens part is moved vertically to the optical axis direction during the tilt image pickup, aberration dur to an optical decentering is generated. An amount of the aberration due to the decentering increases as an amount of inclination in an object plane for which the tilt image pickup is performed increases because a movement amount of the lens part in the vertical direction increases. For this reason, in the image pickup optical system disclosed in Japanese Patent Application Laid-Open No. 2019-090952, an amount of inclination of an object plane on which a fine focusing can be obtained by the tilt image pickup.

SUMMARY OF THE DISCLOSURE

An optical system includes: a first lens unit configured to move to have a component of direction perpendicular to an optical axis; and a second lens unit configured to move to have a component of direction perpendicular to the optical axis, in which a sign of an amount of movement of the lens units is defined as negative for a moving direction of the first lens unit and as positive for an opposite direction to the moving direction of the first lens unit, a product of an amount of movement of the first lens unit and a focal length of the first lens unit and a product of an amount of movement of the second lens unit and a focal length of the second lens unit are different from each other in sign, and wherein the following inequalities are satisfied, $$0.4 < |Pa| + |Pb| < 12.0, \text{ and}$$

$$0 < Lbk/f < 0.65$$

where Pa represents a Petzval sum of the first lens unit, Pb represents a Petzval sum of the second lens unit, f represents a focal length of the optical system, and Lbk represents a back focus of the optical system.

Further features of the disclosure will become apparent from the following description of exemplary embodiments with reference to the attached drawings.

DESCRIPTION OF THE EMBODIMENTS

Figure 1A:
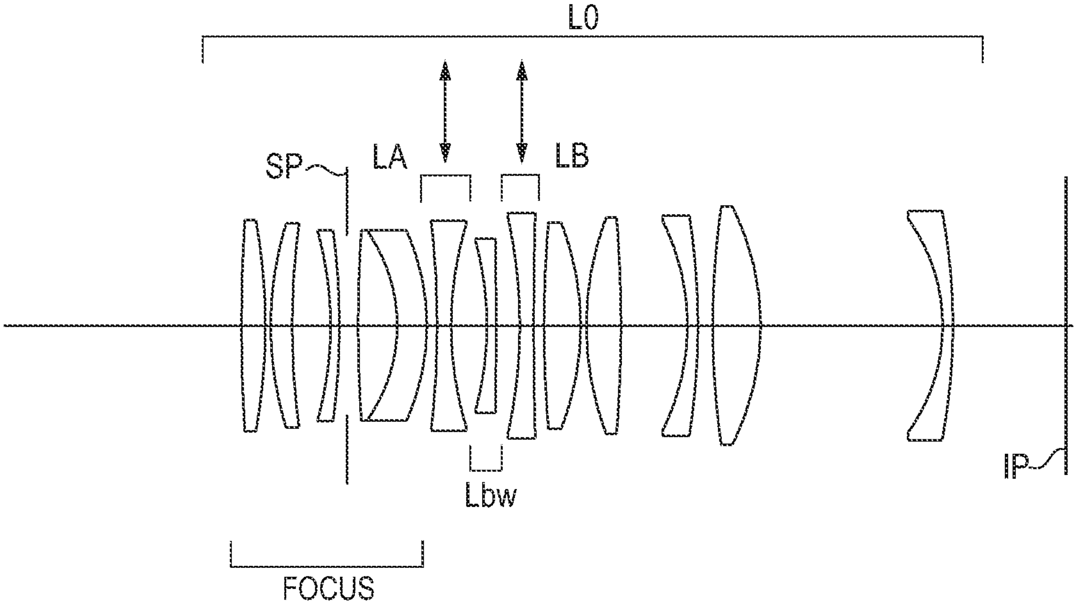
FIG. 1A is a cross sectional view of an optical system of Embodiment 1 in normal image pickup with focusing at infinity.
Figure 1B:
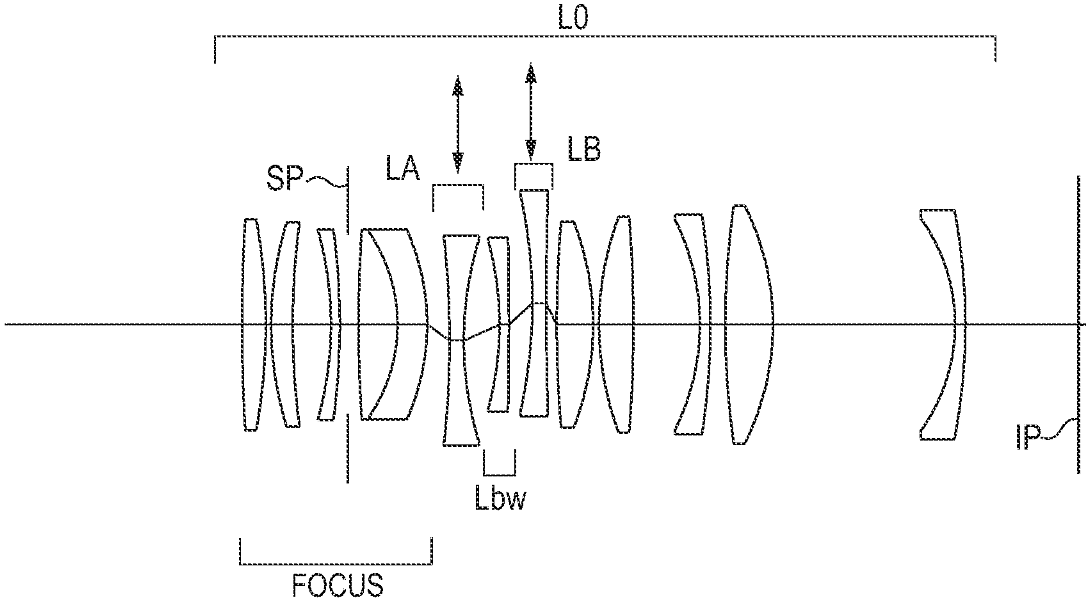
FIG. 1B is a cross sectional view of the optical system of Embodiment 1 in tilt image pickup with focusing at a finite distance.

Hereinafter, embodiments of an optical system of the disclosure and an image pickup apparatus having the same will be described with reference to the accompanying drawings.

An optical system of each embodiment is an optical system used in an image pickup apparatus such as a digital video camera, a digital camera, a television camera, a silver-halide film camera, and a monitoring camera.

In each lens cross sectional diagram, the left side corresponds to an object side (front) and the right side corresponds to an image side (rear). The optical system of each embodiments includes a plurality of lens units.

h this description, a lens unit is a group of lenses that move or rest perpendicular to an optical axis during tilt image pickup. The lens unit may consist of one lens or of a plurality of lenses. The lens unit may also include an aperture stop.

FIGS. 1A, 4A, 7A, 10A, 13A, 16A and 19A are each cross sectional view of the optical systems of Embodiments 1 to 7 in normal image pickup with focusing at an object at infinity. FIGS. 1B, 4B, 7B, 10B, 13B, 16B and 19B are each cross sectional view of the optical systems of Embodiment 1 to 7 in tilt image pickup with focusing at a finite distance. In each lens cross sectional view, Li represents the i-th lens unit counting from object side where i is the order of the lens unit when counting from the object side to the image side. And an aperture stop SP determines (restricts) a beam for an open F number (Fno).

The IP is an image plane, at which an image pickup plane of a solid-state image-pickup element (photoelectric conversion device) such as a CCD sensor or a CMOS sensor is arranged when the optical system of each embodiment is used as an image pickup optical system of a digital still camera or a digital video camera. When the optical system of each embodiment is used as an image pickup optical system of a silver-halide film camera, a photosensitive surface corresponding to the film surface is arranged at the image plane IP.

FIGS. 2A, 5A, 8A, 11A, 14A, 17A, and 20A are longitudinal aberration diagrams of the optical systems of Embodiments 1 to 7 in normal image pickup with focusing at an object at infinity, respectively. FIGS. 2B, 5B, 8B, 11B, 14B, 17B, and 20B are lateral aberration diagrams of the optical systems of Embodiments 1 to 7 in tilt image pickup with focusing at a finite distance, respectively.

In spherical aberration diagrams, solid line represents d-line (wavelength 587.6 nm) and dashed line represents g-line (wavelength 435.8 nm). In astigmatism diagrams, broken line M represents meridional image plane and solid line S represents sagittal image plane. In distortion diagrams, distortion amounts against d-line are drawn. The chromatic aberration of magnification is represented for g-line. ω is half angle of view (degrees) and Fno is F-number.

FIGS. 3, 6, 9, 12, 15, 18, 21 are MTF defocus characteristic diagrams of the optical systems of Embodiments 1 to 7 in tilt image pickup with focusing at a finite distance. In MTF defocus characteristic diagrams shown in FIGS. 3, 6, 9, 12, and 15, the horizontal axis represents defocus amount (mm) with respect to the paraxial image plane with a scale of 0.05 mm and the vertical axis represents MTF value with a scale of 0.1 (10%). In MTF defocus characteristic diagrams shown in FIGS. 18 and 21, the horizontal axis represents defocus amount (mm) with respect to the paraxial image plane with a scale of 0.10 mm, and the vertical axis represents MTF value with a scale of 0.1 (10%). Further, each diagram is represented with a calculation wavelength being an e-line (546.1 nm) and an MTF response for a condition of 30 lines/mm at a center portion corresponding to the optical axis position and at an image height of ±20 mm from the center portion. The solid line indicates MTF response in sagittal direction and the dashed line indicates MTF response in meridional direction.

Abbe number vd is expressed by, $$vd=(Nd-1)/(NF-NC) \tag{A}$$

where Nd, NF and NC represent refractive indices of materials for d-line (587.6 nm), F-line (486.1 nm) and C-line (656.3 nm), respectively.

Back focus is air-equivalent optical path length of a distance along the optical axis from the most image-side surface of the optical system to the paraxial image plane. Total lens length is a sum of a distance from a most object-side surface to the most image-side surface of the optical system and the back focus.

Next, principle of the tilt image pickup in the optical system of the aspect of the embodiments will be described.

Figure 23:
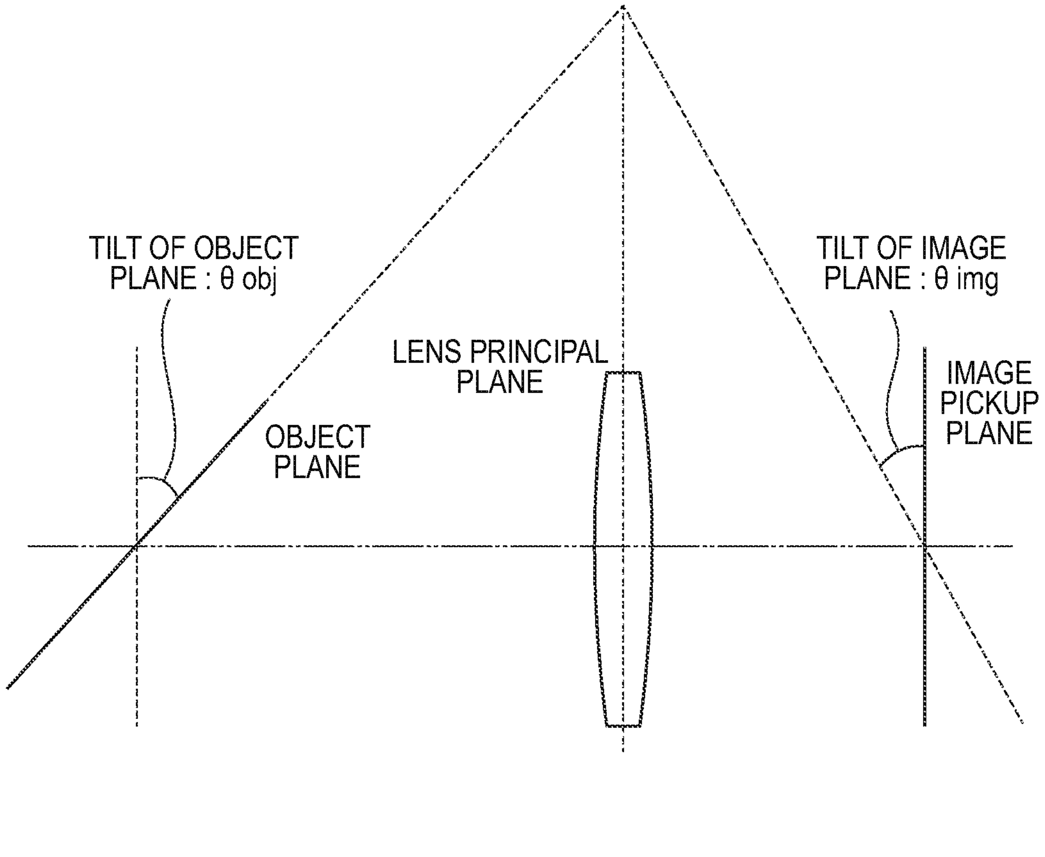
FIG. 23 is an explanatory diagram of Sheimpflug principle.

An object plane, inclined by an angle θobj to the optical axis direction of an image pickup optical system (with a normal line of the object plane being inclined by an angle θobj with respect to the optical axis), has an image plane inclined by angle θimg from a vertical surface as shown in FIG. 23, which satisfies Scheimpflug principle by a lens with a principal plane perpendicular to optical axis. Since an image pickup plane of the normal image pickup apparatus is perpendicular to the optical axis, an object plane tilted more than a depth of focus cannot be imaged on the image pickup plane with a fine focus.

As a correction technique of inclination θimg of image plane (hereinafter referred to as image plane tilt) generated by the inclination of the object plane by angle θobj, method using aberration caused by optical decentering of a lens is known (Japanese Patent Application Laid-open No. 2019-090952). This utilizes the image plane tilt generated by the optical decentering (FIG. 24), but the correction amount in such mechanism is smaller in comparison to a case of an image pickup optical system in which a tilt mechanism is used to correct the image plane tilt.

In order to correct the image plane tilt generated by inclination of the object plane, in the optical system of the disclosure, Petzval sums of a decentering lens unit A (first decentering lens unit) configured to move vertically to the optical axis and a decentering lens unit B (second decentering lens unit) configured to move vertically to the optical axis are appropriately set. Also, in order to suppress the composition shift during tilt image pickup, the movement directions vertical to the optical axes of the decentering lens unit A and the decentering lens unit B are appropriately set so that the directions of the composition shifts generated depending on the power and the direction of the decentering of the decentering lens units are opposite to each other between the decentering lens unit A and the decentering lens unit B. Thus, a tilt image pickup with a small composition shift and large correction amount is easily obtained.

Hereinafter, the correction amount of image plane tilt is called as tilt effect, and the composition shift is called as shift effect.

The movement in the direction perpendicular to the optical axis of the decentering lens unit is called as decentering.

Next, characteristic configuration of each embodiment in the optical system will be described.

The optical system of the disclosure satisfies the following inequalities (1), (2) and (3).

$$0.4<|Pa|+|Pb|<12.0 \tag{1}$$

$$(Ma_{max}\times fa)/(Mb_{max}\times fb)<0 \tag{2}$$

$$0<LBK/f<0.65 \tag{3}$$

where Pa and Pb represent Petzval sums of the decentering lens units A and B, respectively, fa and fb represent focal lengths of the decentering lens units A and B, respectively, f represents a focal length of the entire optical system, $Ma_{max}$ and $Mb_{max}$ represent maximum movement amounts in the respective vertical directions with respect to the optical axis of the decentering lens units A and B, respectively, and Lbk represents back focus of the optical system.

The technical meaning of each of the above-mentioned inequalities will be explained. The inequality (1) defines a sum of a product of Petzval sum of the decentering lens unit A and the focal length of the optical system and a product of Petzval sum of the decentering lens unit B and the focal length of the optical system. If the lower limit condition of the inequality (1) is not satisfied, since a large amount of the decentering is required to obtain a sufficient tilt effect in the tilt image pickup, the decentering aberration increases as the decentering amount increases, and it becomes difficult to keep fine optical performance. The increase in the decentering amount was accompanied by an increase in a diameter of the decentering lens unit, which resulted in the enlargement of optical system. If the upper limit condition of the inequality (1) is not satisfied, a sufficient tilt effect can be obtained by a small decentering amount but it becomes difficult to keep the optical performance fine in the tilt image pickup because decentration aberration amount per unit decentering amount increases.

The product of Petzval sum and the focal length of the optical system described in the inequality (1) is defined as follows:

$$P=-\sum_{v=i}^{k}\left(\frac{1}{N'_v}-\frac{1}{N_v}\right)\frac{f}{r_v} \tag{B}$$

P: product of Petzval sum and focal length of the optical system $r_v$: paraxial radius of curvature radius of v-th surface $N_v$: refractive index for d-line of incident side medium of v-th surface $N'_v$: refractive index for d-line of exit side medium of v-th surface f: focal length of the entire optical system The inequality (2) represents a relationship of the shift effect caused by the decentering lens unit A and the shift effect caused by the decentering lens unit B.

Here, the signs of the amount of movement defines as negative for a movement direction of the decentering lens unit A perpendicular to the optical axis and as positive for its opposite direction. Maximum movement amount means a movement amount of each decentering lens unit in a tilt image pickup at the maximum tilt amount as a product specification. Even if the movement of the decentering lens unit A or the decentering lens unit B causes in a negative direction, amount of movement to a position to which the decentering lens unit is moved during a tilt image pickup at the maximum tilt effect amount described in the product specification is treated as a maximum movement amount.

The inequality (2) specifies that a sign of a product of a focal length fa of the decentering lens unit A and the maximum movement amount of the decentering lens unit A in a direction vertical to the optical axis and a sign of a product of a focal length fb of the decentering lens unit B and the maximum movement amount of the decentering lens unit B in a direction vertical to the optical axis are different from each other. That is, the product of amount of movement of the first decentering lens unit and the focal length of the first decentering lens unit, and the product of the amount of movement of the second decentering lens unit and the focal length of the second decentering lens unit are opposite to each other in sign. Here, as to the sign of the amount of movement of the decentering lens unit, the movement direction of the first decentering lens unit is negative, and the opposite direction to the movement direction of the first decentering lens unit is positive. If the inequality (2) is satisfied, the shift effects becomes a relationship to cancel each other because the directions in which the respective compositions shift are opposite to each other.

The inequality (3) defines a ratio of back focus to a focal length of the entire optical system. If the upper limit condition of the inequality (3) is not satisfied, the total length of the lens becomes long and the effective diameter of the front lens increases so that it is difficult to downsize the optical system.

In tilt image pickup, lens units arranged in the image side of the decentering lens unit cause decentering aberration due to a change of the traveling path of beam caused by the decentering of the decentering lens unit. The amount of the decentering aberration is reduced as the lens unit is disposed closer to the image plane when satisfying the inequality (2) and minimizing the generation of shift effect as small as possible. Thus, by shortening back focus of the optical system and arranging a lens unit near the image plane so as to satisfy the inequality (3), it is possible to reduce the difference of aberration generation amount between normal image pickup and tilt image pickup. In addition, in a lens arranged near an image, axial beam height becomes low so that occurrence of spherical aberration, comatic aberration, and the like is reduced, and hence a control of off-axial aberration such as curvature of field and the like becomes easy.

More preferably, the numerical value ranges of the inequalities (1) and (3) are set as the following inequalities (1a) and (3a), respectively.

$$0.5 < |Pa| + |Pb| < 11.0 \tag{1a}$$

$$0 < Lbk/f < 0.62 \tag{3a}$$

More preferably, the numerical value ranges of the inequalities (1) and (3) are set as the following inequalities (1b) and (3b).

$$0.6 < |Pa| + |Pb| < 10.0 \tag{1b}$$

$$0 < Lbk/f < 0.59 \tag{3b}$$

Here, Pa of the decentering lens unit A and Pb of the decentering lens unit B preferably satisfy the following inequalities.

$$0.5 < |Pa|/|Pb| < 2.0 \tag{4}$$

In order to cancel the shift caused by the decentering of the lens unit to obtain the tilt effect, the decentering lens units A and B are decentered relative to the optical axis position so that the value of ($Ma_{max}$×fa) in the decentering lens unit A and the value of ($Mb_{max}$×fb) in the decentering lens unit B are different from each other in sign. the shift effect caused by the decentering of one of the decentering lens units is larger as the absolute value of Petzval sum of the lens unit is larger. The decentering amount of the decentering lens unit, which is necessary to cancel the shift effect that has caused by the other decentering lens unit, is larger as the absolute value of Petzval sum of the decentering lens unit is smaller. On the other hand, as decentering amount of the lens unit increases, aberration that arises also increases and lens barrel also increases in size. Therefore, in order to obtain an efficient tilt effect and to obtain a tilt effect in a state of suppressing aberration by suppressing amount of movement of the decentering lens unit to cancel the shift effect, the sizes of the absolute values of Pa and Pb of the decentering lens unit A and B are preferably the same. Therefore, if the upper limit or the lower limit of the inequality (4) is not satisfied, amount of movement of the decentering lens unit for canceling the generated shift effect increases, and the generated aberration increases and lens barrel also becomes larger in size, which is undesirable.

More preferably, the numerical range of the inequality (4) is set as the inequality (4a).

$$0.6 < |Pa|/|Pb| < 18 \tag{4a}$$

More preferably, the numerical range of the inequality (4) is set as the inequality (4b).

$$0.8 < |Pa|/|Pb| < 16 \tag{4b}$$

Next, a description will be given of a configuration that is preferably satisfied in an optical system L0 of each embodiment.

The optical system of each embodiment preferably satisfies one or more of the following inequalities (5) to (16).

$$0 < (Ma_{max} \times PEa)/(Mb_{max} \times PEb) \tag{5b}$$

$$0 < |(IIIEa \times Sb) - (IIIEb \times Sa)| < 6.0 \tag{6}$$

-continued $$0<|(IIEa\times Sb)-(IIEb\times Sa)|<2.5 \quad (7)$$

$$\beta a\times\beta bw<0 \quad (8)$$

$$0.07<|fa|/f<2.0 \quad (9)$$

$$0.07<|fb|/f<2.0 \quad (10)$$

$$0<|LshA/Lopt|<0.5 \quad (11)$$

$$0<|LshB/Lopt|<0.5 \quad (12)$$

$$0.01<|Ma_{max}|/\varphi a<0.5 \quad (13)$$

$$0.01<|Mb_{max}|/\varphi b<0.5 \quad (14)$$

$$0.5<Lopt/f<3.0 \quad (15)$$

$$-0.5<fa/fbw<4.0 \quad (16)$$

Here, each symbol is defined as follows.

PEa denotes a decentering aberration coefficient representing a sensitivity of the image plane tilt to the parallel decentering of the decentering lens unit A to the optical axis, PEb denotes a decentering aberration coefficient representing a sensitivity of the image plane tilt to the parallel decentering of the decentering lens unit B to the optical axis. Note that the decentering aberration coefficient PEv representing the sensitivity of the image plane tilt to the parallel decentering of the v-th lens to the optical axis, is expressed by the following equation.

$$PE_v=\alpha'_v\sum_{\mu=v+1}^{k}P_\mu-\alpha_v\sum_{\mu=v}^{k}P_\mu=(\alpha'_v-\alpha_v)\sum_{\mu=v+1}^{k}P_\mu-\alpha_vP_v \quad (C)$$

Pμ: Petzval sum of the μ-th lens

αv: incident angle of object paraxial beam of the v-th lens

β'v: exit angle of object paraxial beam of the v-th lens

The first term of formula (C)

$$(\alpha'_v-\alpha_v)\sum_{\mu=v+1}^{k}P_\mu$$

represents the sensitivity of the image plane tilt to the parallel decentering of mainly a lens unit disposed in the image side of the centering lens unit. The second term (−αvPv) represents the sensitivity of the image plane tilt to the decentering lens unit. The product of the sensitivity and the decentering amount is the amount of the image plane tilt.

Here, IIIEa denotes a decentering aberration coefficient representing astigmatism caused by a parallel decentering of the decentering lens unit A to the optical axis and IIIEb denotes a decentering aberration coefficient representing astigmatism caused by a parallel decentering of the decentering lens unit B to the optical axis. The decentering aberration coefficient IIIEv, which represents astigmatism caused by a parallel decentering of the v-th lens, is expressed by the following equation.

$$IIIE_v=\left(\alpha'_v\sum_{\mu=v+1}^{k}III_\mu-\alpha_v\sum_{\mu=v}^{k}III_\mu\right)-\left(\alpha'_{v_{pupil}}\sum_{\mu=v+1}^{k}II_\mu-\alpha_{v_{pupil}}\sum_{\mu=v}^{k}II_\mu\right) \quad (D)$$

IIIμ: astigmatism coefficient III of the μ-th lens

IIμ: comatic aberration coefficient II of the μ-th lens $\alpha_v$: incident angle of object paraxial beam of the v-th lens $\alpha'_v$: exit angle of object paraxial beam of the v-th lens $\alpha_{v\_pupil}$: incident angle of paraxial chief ray of the v-th lens $\alpha'_{v\_pupil}$: exit angle of paraxial chief ray of the with lens A decentering sensitivity of the decentering lens unit A is denoted as Sa, and a decentration sensitivity of the decentering lens unit B is denoted as Sb. A decentering sensitivity Sv is expressed by the following equation (E), $$S_v=(1-\beta_v)\beta_k \quad (E)$$

where βv represents a lateral magnification of the decentering lens unit v and βk represents a total lateral magnification of lens units disposed in the image side of the decentering lens unit.

Here, IIEa denotes a decentering aberration coefficient representing a comatic aberration caused by a parallel decentering of the decentering lens unit A to the optical axis, and IIEb denotes a decentering aberration coefficient representing a comatic aberration caused by a parallel decentering of the decentering lens unit B to the optical axis. Note that the decentering aberration coefficient IIEv, which represents a comatic aberration caused by a parallel decentering of the v-th lens to the optical axis, is expressed by the following equation.

$$IIE_v=\left(\alpha'_v\sum_{\mu=v+1}^{k}II_\mu-\alpha_v\sum_{\mu=v}^{k}II_\mu\right)-\left(\alpha'_{v_{pupil}}\sum_{\mu=v+1}^{k}I_\mu-\alpha_{v_{pupil}}\sum_{\mu=v}^{k}I_\mu\right) \quad (F)$$

IIμ: comatic aberration coefficient II of the μ-th lens

Iμ: spherical aberration coefficient I of the μ-th lens $\alpha_v$: incident angle of object paraxial beam of the v-th lens $\alpha'_v$: exit angle of object paraxial beam of the v-th lens $\alpha_{v\_pupil}$: incident angle of paraxial chief ray of the v-th lens $\alpha'_{v\_pupil}$: exit angle of paraxial chief ray of the with lens When the decentering lens unit A, an intermediate lens unit bw and the decentering lens unit B are arranged in this order from the object side to the image side, a magnification of the decentering lens unit A is represented by βa and a magnification of the intermediate lens unit is represented by βbw.

The total length of the optical system is represented by Lopt, and a distance on the optical axis from the aperture stop to an optical surface of the decentering lens unit A disposed farthest from the aperture stop is represented by LshA, and a length on the optical axis from the aperture stop to an optical surface of the decentering lens unit B disposed farthest from the aperture stop is represented by LshB.

An effective diameter of the decentering lens unit A is presented by φa and an effective diameter of the decentering lens unit B is represented by φb. In this disclosure, an effective diameter of a lens is defined as a diameter of a circle whose radius is the height from the optical axis of a beam passing through a lens surface at the farthest away from the optical axis among beams passing through the lens surface. The effective diameters φa and φb of the respective decentering lens units are the values of the effective diameters at the normal image pickup state in which the decentering lens unit is not decentered.

The focal length of the intermediate lens unit is represented by fbw where the decentering lens unit A, the intermediate lens unit bw, and the decentering lens unit B are arranged in this order from the object side to the image side.

Next, the technical meanings of the above-mentioned inequalities will be explained.

The inequality (5) defines a relationship between the tilt effect generated in the decentering lens unit A and the tilt effect generated in the decentering lens unit B. That is, the inequality (5) defines that the sign of the product of the amount of movement and PEa in the decentering lens unit A is the same as the sign of the product of the amount of movement and PEb in the decentering lens unit B. In other words, the sign of the product of the decentering aberration coefficient of the first decentering lens unit and the amount of movement of the first decentering lens unit is the same as the sign of the product of the decentering aberration coefficient of the second decentering lens unit and the amount of movement of the second decentering lens unit. Here, the decentering aberration coefficient is a coefficient that represents a sensitivity of image plane tilt to the parallel decentering of a lens unit to the optical axis. In a case where the inequality (5) is satisfied, when the decentering lens units are parallelly decentered in directions satisfying the inequality (3), respectively, the tilt effects are enforced by each other because directions of the image plane tilt generated in each case coincides to each other, so that a tilt image pickup with a large correction amount can be performed.

The inequality (6) relates to the decentering astigmatism aberration coefficient III in a case where the shift effect generated in each decentering lens unit is reduced as small as possible. If the upper limit of the inequality (6) is not satisfied, the decentering astigmatism from the center to the peripheral image height increases and it is not preferable because a good optical performance cannot be obtained in the tilt image pickup.

The inequality (7) relates to the decentering coma aberration coefficient II in a case where the shift effect generated in each decentering lens unit is reduced as small as possible. If the upper limit of the inequality (7) is not satisfied, the comatic aberration from the center to the peripheral image height increases, and it is not preferable because a good optical performance cannot be obtained in the case of tilt image pickup.

The inequality (8) divines a relationship between the incident angles of the object paraxial beams of the decentering lens unit A and the decentering lens unit B. The inequality (8) defines that sign of the magnification βa of the decentering lens unit A and the sign of the magnification βbw of the intermediate lens unit are different from each other where the decentering lens unit A, the intermediate lens unit bw, and the decentering lens unit B are arranged in this order from the object side to the image side. If the upper limit of the inequality is not satisfied (βa and βbw are the same sign), the signs of the incident angles of the object paraxial beams of the decentering lens unit A and the decentering lens unit B coincide to each other. Therefore, if each decentering lens unit is decentered to cancel the shift effect, the tilt effect is also canceled in the same manner and the tilt effect is reduced, which is undesirable.

The inequality (9) and the inequality (10) define ratios of the focal lengths of the decentering lens units to the focal length of the entire optical system. If the upper limit of each inequality is not satisfied, the amount of decentering aberration generated in each decentering lens unit increases and a good optical performance cannot be obtained, which is not preferable. IF the lower limit of each inequality is not satisfied, the amount of tilt effect per unit decentering amount decreases, and therefore the decentering amount to obtain a sufficient tilt effect increases. Since the increase of the decentering amount accompanies the increase of the decentration aberration and it becomes difficult to obtain a good optical performance, which is not preferable.

The inequality (11) and the inequality (12) define ratios of the distance from the aperture stop to each of the decentering lens units. If the each upper limit of the inequalities is not satisfied, the external diameter of the decentering lens unit increases and downsizing of the optical system becomes difficult, which is not preferable. If the lower limit of the conditional expression is not satisfied, the decentering lens unit cannot be arranged because the decentering lens unit contacts with the aperture stop, which is undesirable.

The inequality (13) and the inequality (14) define ratios of the decentering amounts of each decentering lens unit to the effective diameters of each decentering lens unit. If the upper limit of each inequality is not satisfied, the lens diameter of the decentering lens unit increases to prevent vignetting of beam due to the decentering of the lens unit and the optical system becomes large in size, which is undesirable. If the lower limit of the inequalities is not satisfied, a sufficient tilt effect cannot be obtained, which is undesirable.

The inequality (15) defines a ratio of a total lens length to a focal length of the entire optical system, and is to appropriately set a so-called telephoto ratio. If the upper limit of the inequality (15) is not satisfied, the total lens length is long so that the size of the effective diameter of the front lens increases and which makes it difficult to downsize the optical system. If the lower limit of the inequality (15) is not satisfied, the total lens length is short and Petzval sum becomes too large in a positive direction, so the curvature of field increases and it becomes difficult to correct it.

The inequality (16) defines a ratio of a focal length of the decentering lens unit A to a focal length of the intermediate lens unit bw which is disposed between the decentering lens unit A and the decentering lens unit B. If the upper limit of the inequality (16) is not satisfied, the amount of tilt effect per unit decentering amount of the decentering lens unit A decreases, and the amount of decentering amount to obtain a sufficient tilt effect increases. The increase of decentering amount is not preferable because it accompanies the increase of decentering aberration and it becomes difficult to obtain a good optical performance. If the lower limit of the inequality (16) is not satisfied, a power of either the decentering lens unit A or the intermediate lens unit bw increases to make the directions of image plane tilt of the decentering lens unit A and the decentering lens unit B coincide with each other, which causes an increase in amount of aberration and therefore is undesirable.

The numerical value ranges of the inequalities (6), (7), (9) to (16) are preferably set as the following range of inequalities (6a), (7a), (9a) to (16a), respectively.

$$0 < |(IIIEa \times Sb) - (IIIEb \times Sa)| < 5.9 \quad (6a)$$

$$0 < |(IIEa \times Sb) - (IIEb \times Sa| < 2.4 \quad (7a)$$

-continued $$0.08<|fa|/f<1.5 \quad (9a)$$

$$0.08<|fb|/f<1.5 \quad (10a)$$

$$0.05<|LshA/Lopt|<0.4 \quad (11a)$$

$$0.05<|LshB/Lopt|<0.4 \quad (12a)$$

$$0.03<|Ma_{max}|/\varphi a<0.3 \quad (13a)$$

$$0.03<|Mb_{max}|/\varphi b<0.3 \quad (14a)$$

$$0.6<Lopt/f<2.8 \quad (15a)$$

$$-0.4<fa/fbw<3.0 \quad (16a)$$

The numerical value ranges of the inequalities (6), (7), (9) to (16) are preferably set as the following inequalities (6b), (7b), (9b) to (16b), respectively.

$$0<|(IIIEa\times Sb)-(IIIEb\times Sa)|<5.8 \quad (6b)$$

$$0<|(IIEa\times Sb)-(IIEb\times Sa)|<2.3 \quad (7b)$$

$$0.09<|fa|/f<1.3 \quad (9b)$$

$$0.09<|fb|/f<1.3 \quad (10b)$$

$$0.07<|LshA/Lopt|<0.3 \quad (11b)$$

$$0.07<|LshB/Lopt|<0.3 \quad (12b)$$

$$0.04<|Ma_{max}|/\varphi a<0.22 \quad (13b)$$

$$0.04<|Mb_{max}|/\varphi b<0.2 \quad (14b)$$

$$0.7<Lopt/f<2.7 \quad (15b)$$

$$-0.3<fa/fbw<2.0 \quad (16b)$$

Next, a preferable configuration for satisfying the inequalities (2) and (5) to increase the tilt effect amount will be described.

When the decentration aberration coefficient PE increases, the image plane tilt per unit decentering amount increases. The direction of the image plane tilt depends on the direction of the decentering and the sign of the decentering aberration coefficient PE. There is a case where when the inequality (2) is satisfied to suppress the shift effect, the inequality (5) cannot be satisfied and the tilt effect may be canceled each other in the same manner as the shift effect. This is because both of the signs of the shift effect and the tilt effect depend on the power of the decentering lens. In the case of a tilt image pickup, a sufficient amount of the image plane tilt cannot be obtained naturally if the tilt effect is suppressed along with the shift effect, and a good focus on an object plane which is largely tilt to the optical axis cannot be obtained.

Thus, the optical system of the disclosure provides a suitable configuration in a relationship between a lens Petzval sum of lenses disposed in the image side of the decentering lens unit A, a lens Petzval sum of lenses disposed in the image side of the decentering lens unit B, and incident angle αv of object paraxial beam of the decentering lens units A and B. Thus, the amount of the tilt effect generated by each decentering lens unit is large while canceling the shift effect, and it becomes easy to strengthen the tilt effect each other.

In order to cancel the shift effect and enhance the tilt effect each other, the signs of the incident angles αv of the object paraxial beam of the decentering lens unit A and the decentering lens unit B are to be different from each other. Making the incident angles have different signs means that an incident beam to one of the decentering lens units is a convergent beam and an incident beam to the other of the decentering lens units is a divergent beam.

By such control of the incident beam, if the decentering lens units A and B are decentered to cancel the shift effect each other, the directions of the image plane tilt caused by the decentering lens units A and B, indicated by the second term of Equation (C) (−αvPv) can be made the same direction (strengthening the tilt effect each other).

In addition, a sign of Petzval sum of lenses arranged in the image side of the decentering lens unit indicated by the first term of Equation (C) is controlled to make the first term $$(\alpha'_v-\alpha_v)\sum_{\mu=v+1}^{k}P_\mu$$

and the second term (−αvPv) have the same sign. With that, the direction of the image plane tilt by a lens arranged in the image side of the decentering lens unit can be made the same direction as that of the image plane tilt of the decentering lens unit.

Thus, the direction of the image plane tilt caused by the decentering of the decentering lens unit can be made into the same direction, and an optical system with a small shift effect and a large tilt effect per unit decentering amount can be obtained.

Next, optical systems of each embodiment will be described.

Embodiment 1

The optical system of Embodiment 1 includes in order from the object side to the image side a decentering lens unit A (LA) having a negative refractive power, an intermediate lens unit Lbw having a negative refractive power, and a decentering lens unit B (LB) having a negative refractive power.

Figure 2A:
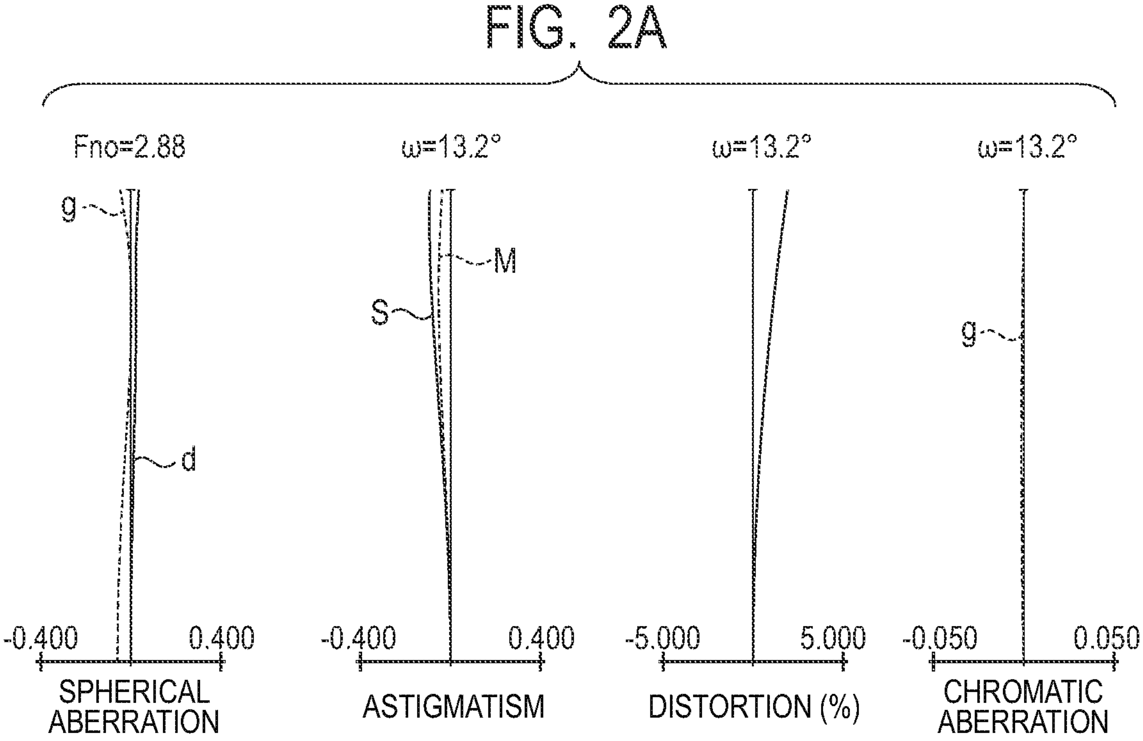
FIG. 2A is a longitudinal aberration diagram of the optical system of Embodiment 1 in normal image pickup with focusing at infinity.
Figure 2B:
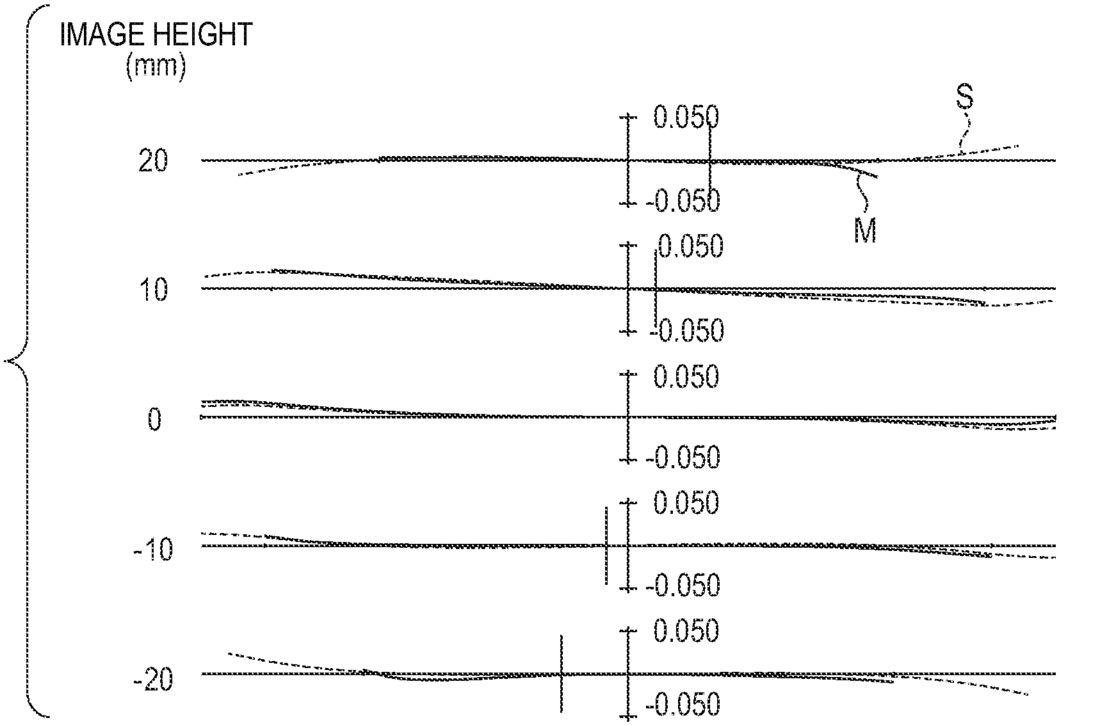
FIG. 2B is a lateral aberration diagram of the optical system of Embodiment 1 in tilt image pickup with focusing at a finite distance.
Figure 3:
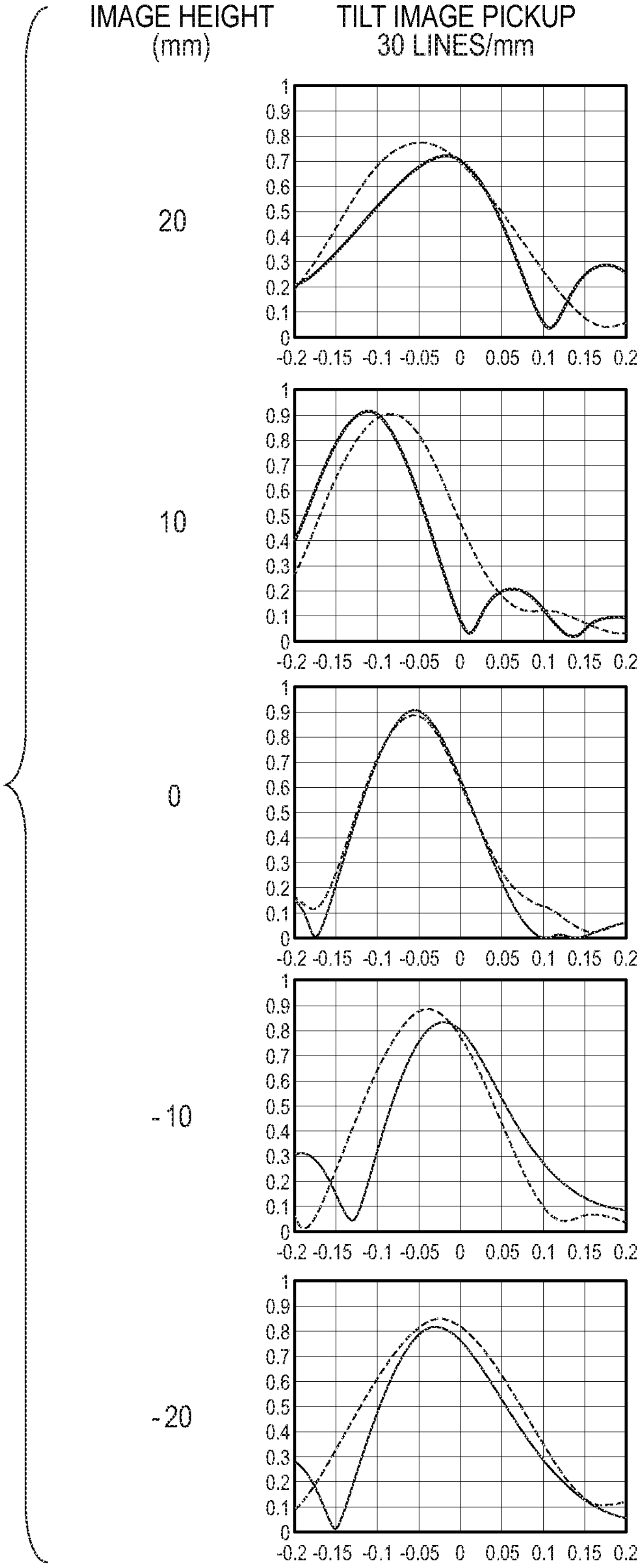
FIG. 3 is an MTF defocus characteristic diagram of the optical system of Embodiment 1 in tilt image pickup with focusing at a finite distance.
Figure 4A:
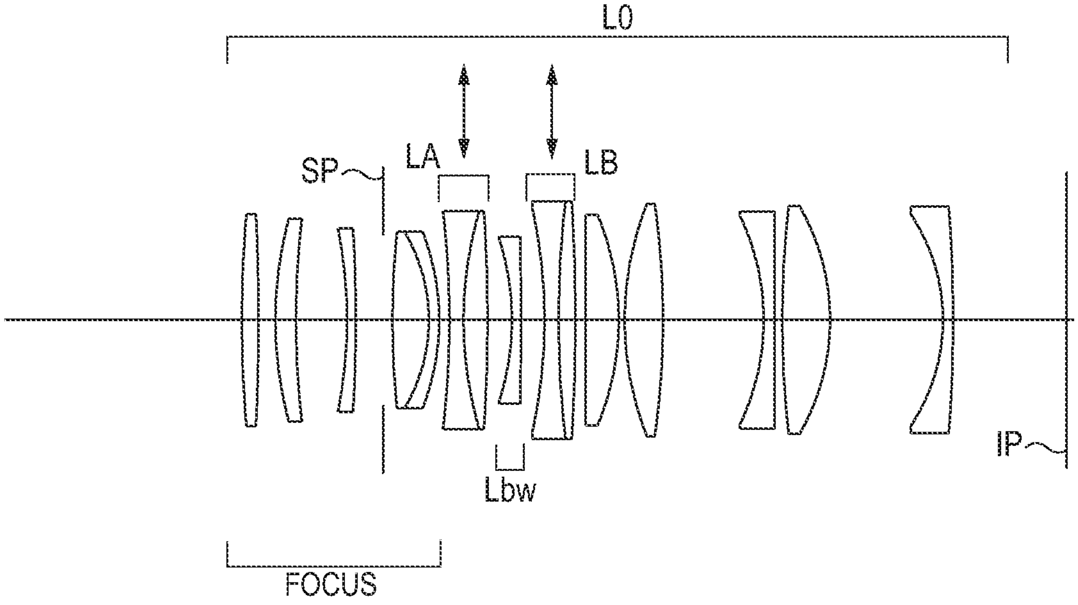
FIG. 4A is a cross sectional view of an optical system of Embodiment 2 in normal image pickup in focusing at infinity.
Figure 4B:
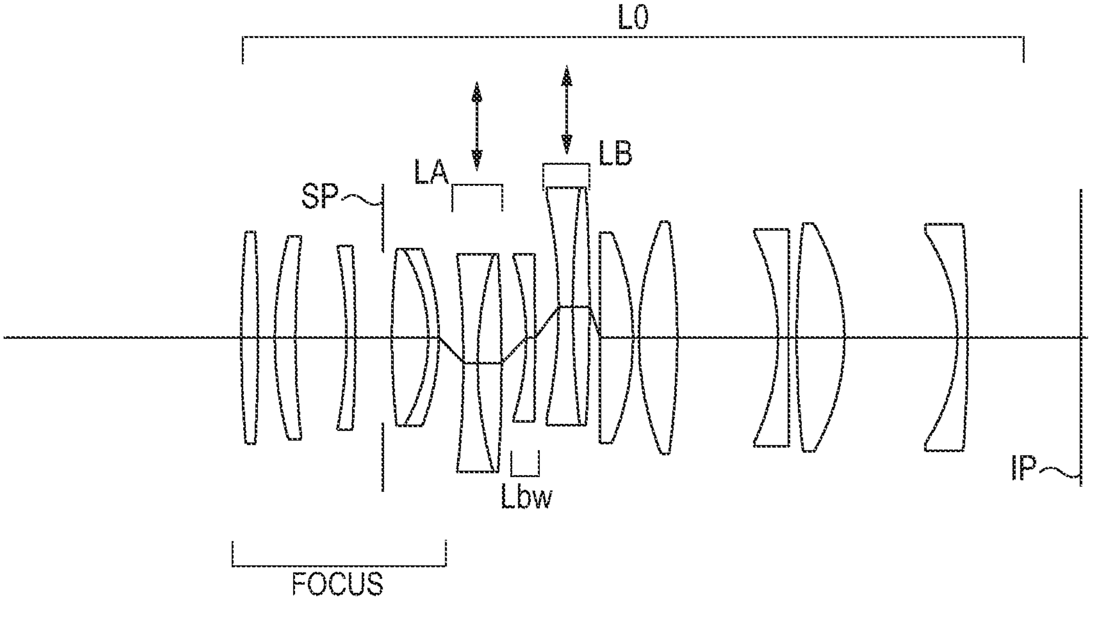
FIG. 4B is a cross sectional view of the optical system of Embodiment 2 in tilt image pickup with focusing at a finite distance.

A lateral aberration diagram shown in FIG. 2B and an MTF defocus characteristic shown in FIG. 3 show the performance during a tilt image pickup in a state where an object plane, located in a position, about 2000 mm away from the first surface of the optical system L0 in distance on the optical axis, tilted about 70 degrees to the optical axis direction of the image pickup optical system.

Embodiment 2

The optical system of Example 2 includes in order from the object side to the image side a decentering lens unit A (LA) having a negative refractive power, an intermediate lens unit Lbw having a negative refractive power, and a decentering lens unit B (LB) having a negative refractive power.

Figure 5A:
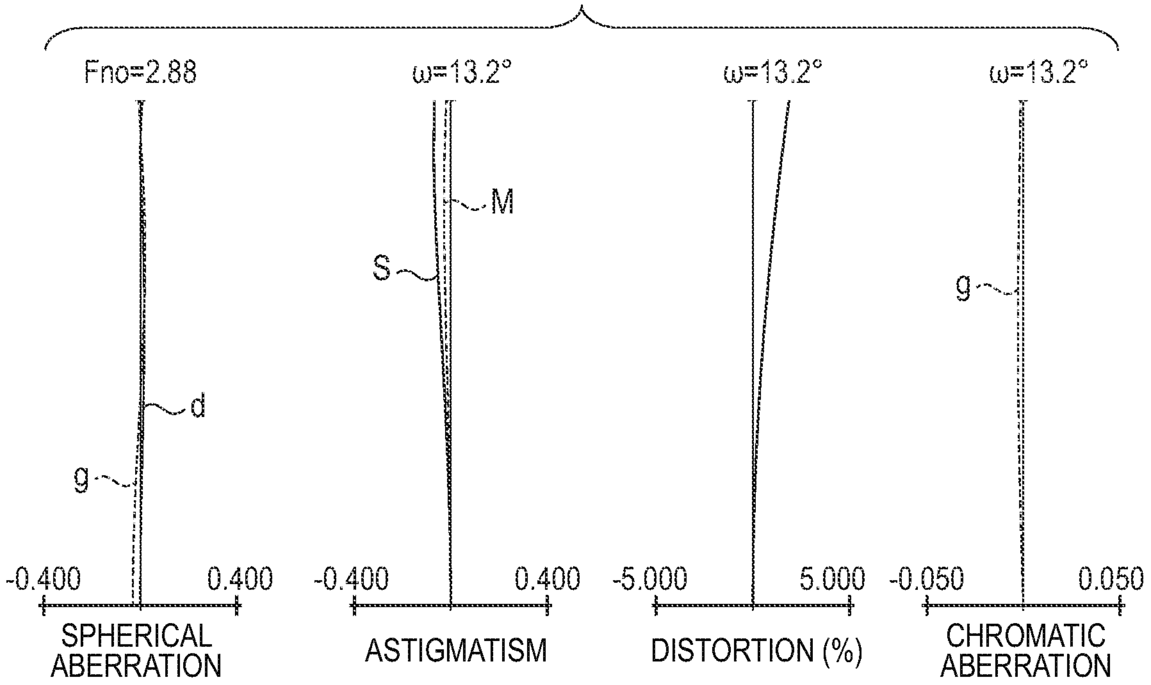
FIG. 5A is a longitudinal aberration diagram of the optical system of Embodiment 2 in normal image pickup with focusing at infinity.
Figure 5B:
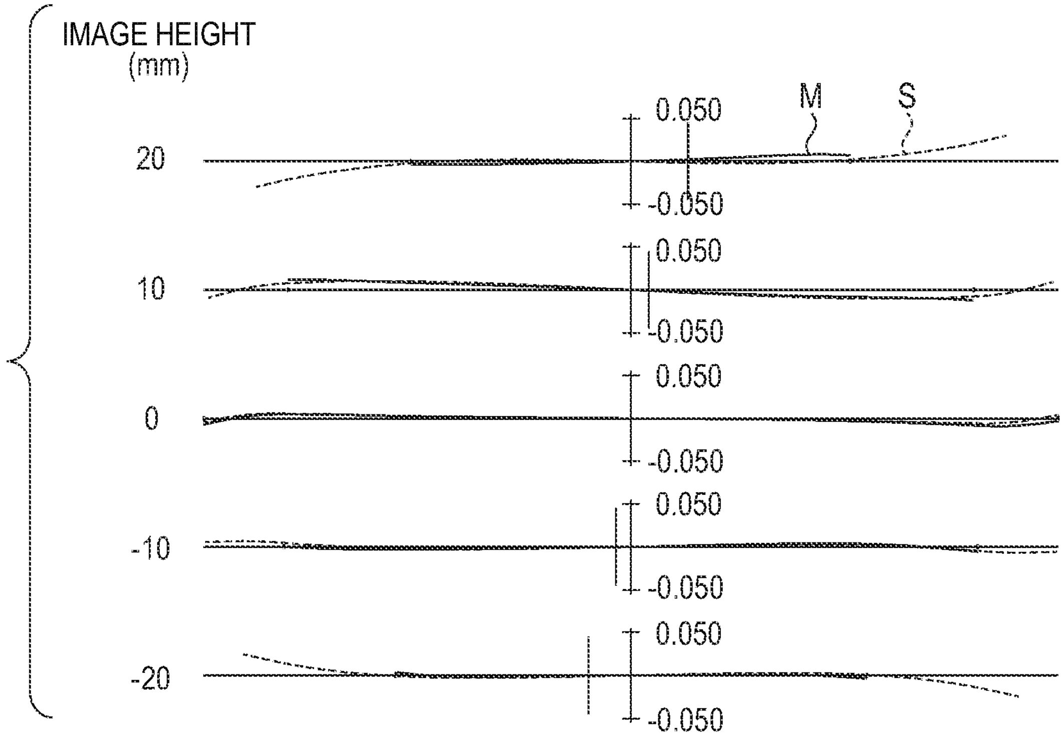
FIG. 5B is a lateral aberration diagram of the optical system of Embodiment 2 in tilt image pickup with focusing at a finite distance.
Figure 6:
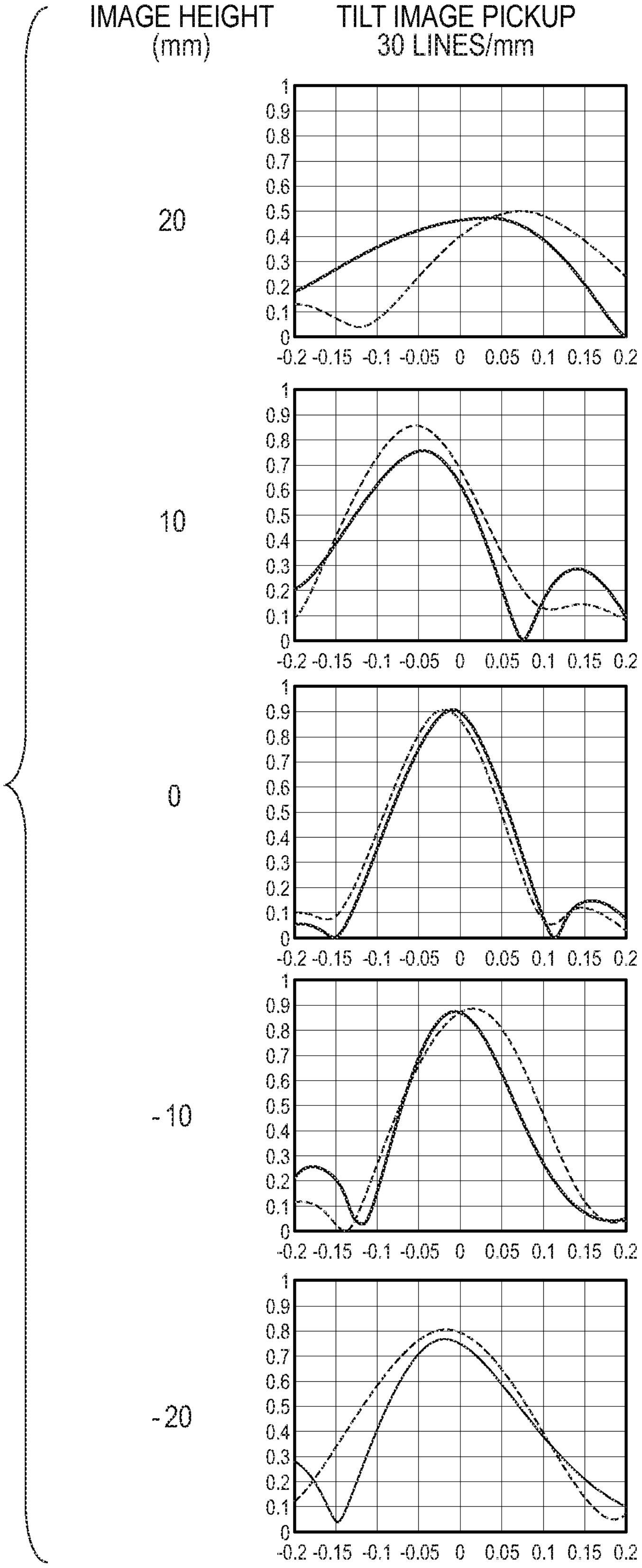
FIG. 6 is an MTF defocus characteristic diagram of the optical system of Embodiment 2 in tilt image pickup with focusing at a finite distance.
Figure 7A:
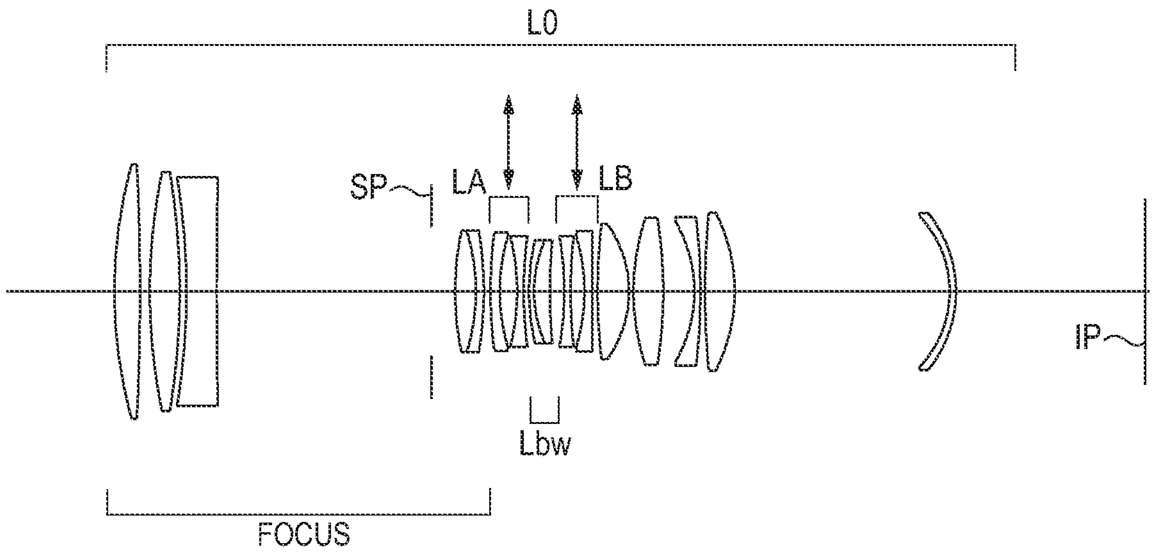
FIG. 7A is a cross sectional view of an optical system of Embodiment 3 in normal image pickup with focusing at infinity.
Figure 7B:
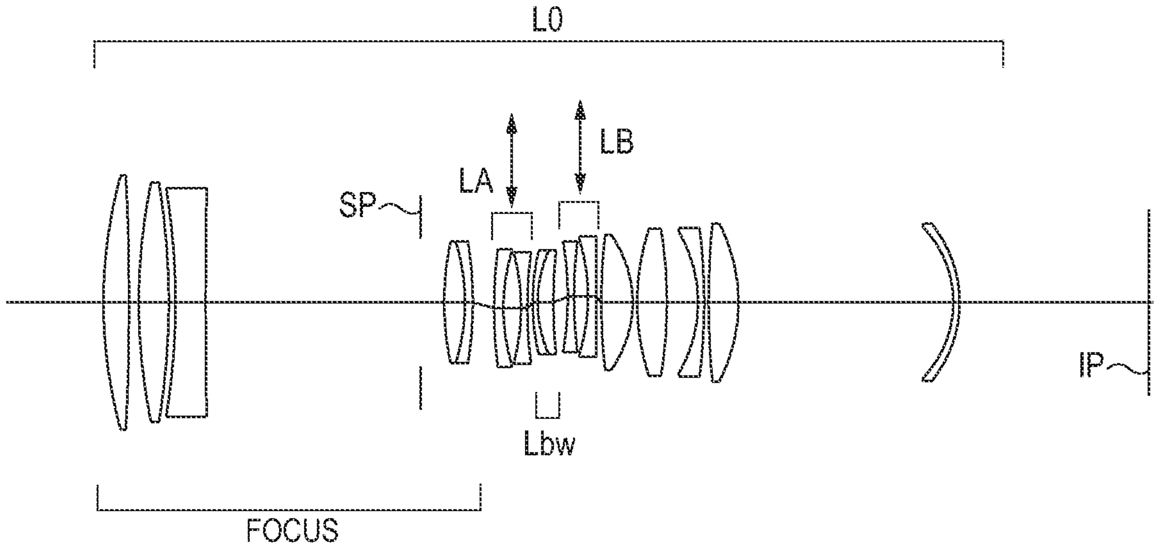
FIG. 7B is a cross sectional view of the optical system of Embodiment 3 in tilt image pickup with focusing at a finite distance.

A lateral aberration diagram shown in FIG. 5B and an MTF defocus characteristic shown in FIG. 6 show the performance during a tilt image pickup in a state where an object plane, located in a position, about 2000 mm away from the first surface of the optical system L0 in distance on the optical axis, tilted about 70 degrees to the optical axis direction of the image pickup optical system.

Embodiment 3

The optical system of Embodiment 3 includes in order from the object side to the image side a decentering lens unit A (LA) having a negative refractive power, an intermediate lens unit Lbw having a positive refractive power, and a decentering lens unit B (LB) having a negative refractive power.

Figure 8A:
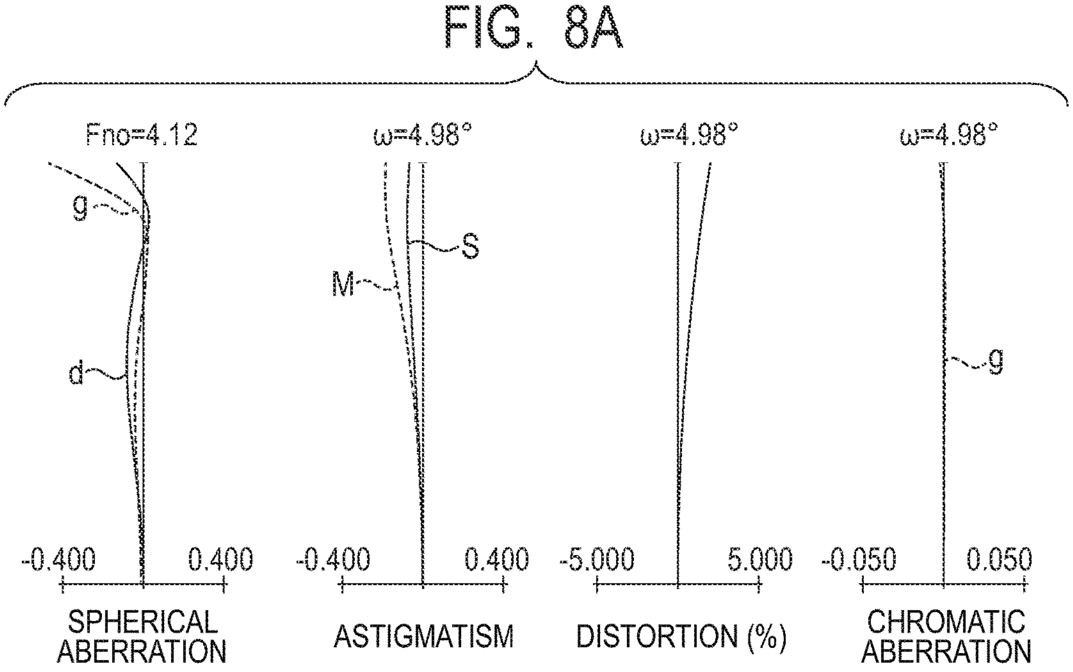
FIG. 8A is a longitudinal aberration diagram of the optical system of Embodiment 3 in normal image pickup with focusing at infinity.
Figure 8B:
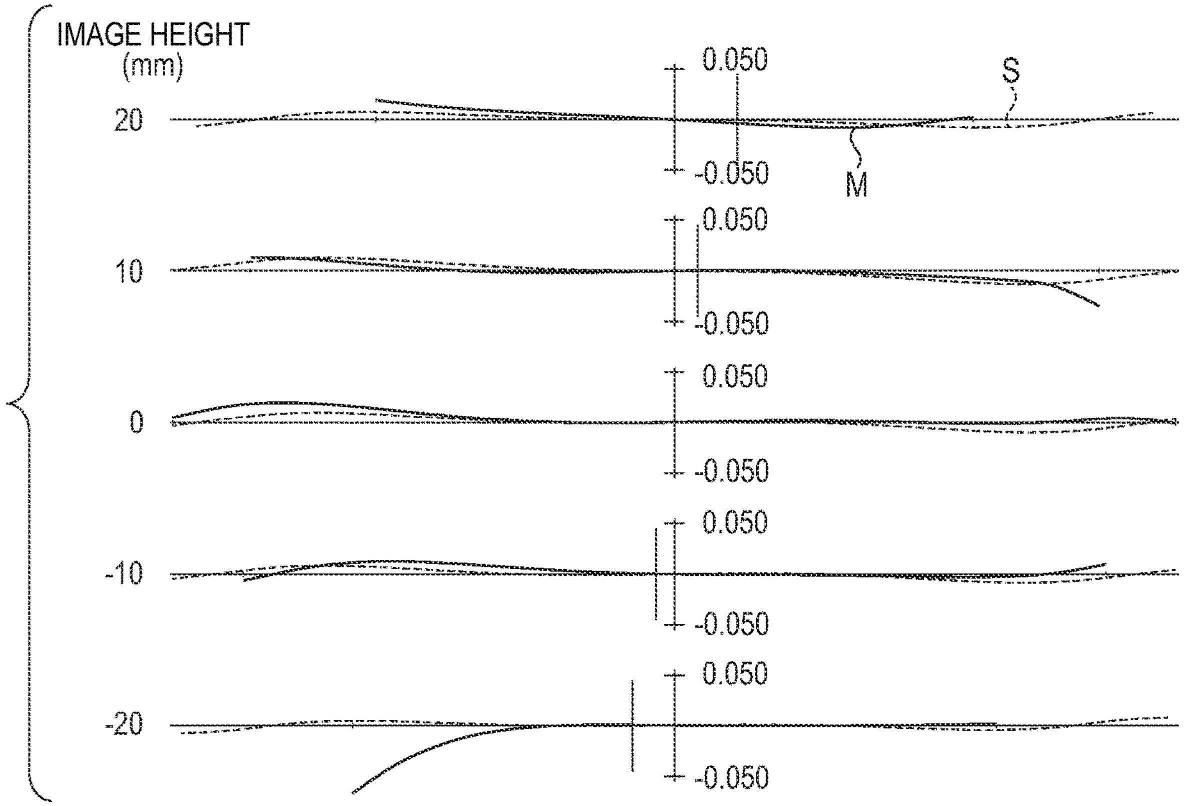
FIG. 8B is a lateral aberration diagram of the optical system of Embodiment 3 in tilt image pickup with focusing at a finite distance.
Figure 9:
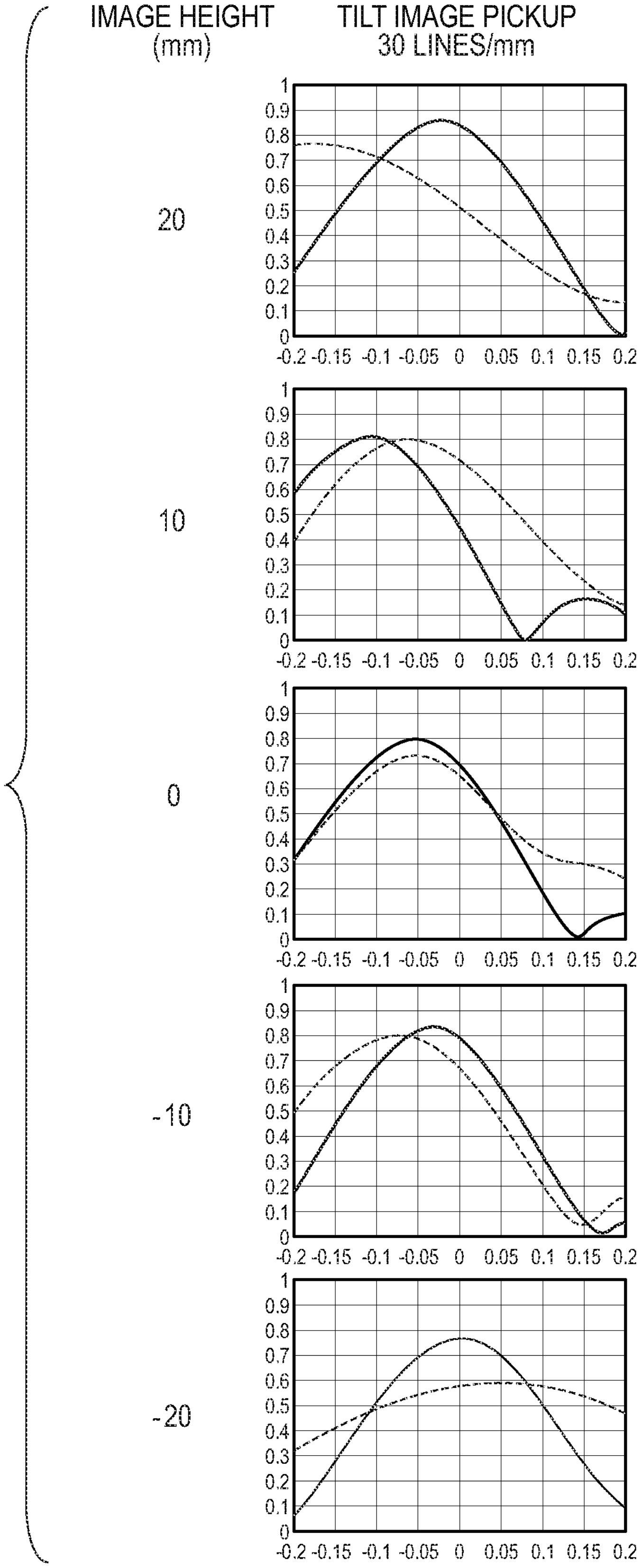
FIG. 9 is an MTF defocus characteristic diagram of the optical system of Embodiment 3 in tilt image pickup with focusing at a finite distance.
Figure 10A:
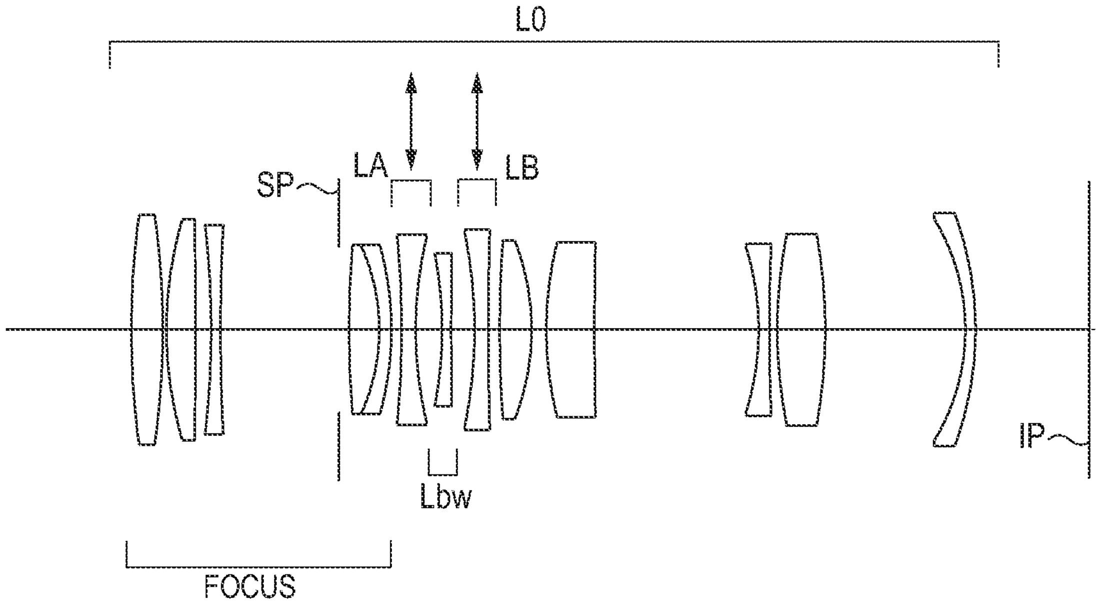
FIG. 10A is a cross sectional view of an optical system of Embodiment 4 in normal image pickup with focusing at infinity.
Figure 10B:
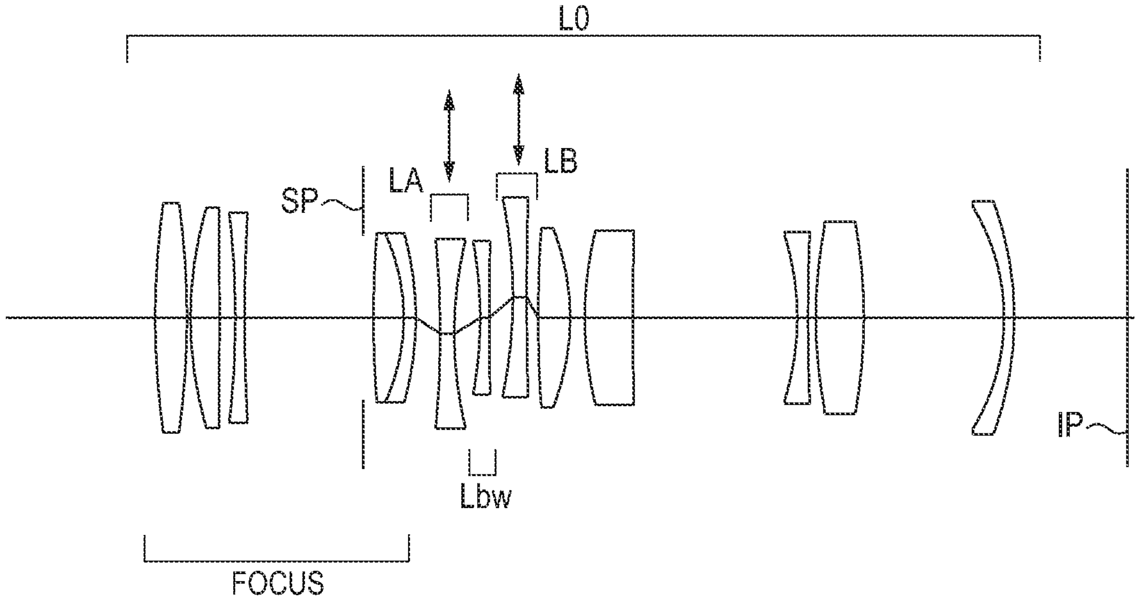
FIG. 10B is a cross sectional view of the optical system of Embodiment 4 in tilt image pickup with focusing at a finite distance.

A lateral aberration diagram shown in FIG. 8B and an MTF defocus characteristic shown in FIG. 9 show the performance during a tilt image pickup in a state where an object plane, located in a position, about 2200 mm away from the first surface of the optical system L0 in distance on the optical axis, tilted about 60 degrees to the optical axis direction of the image pickup optical system.

Embodiment 4

The optical system of Embodiment 4 includes in order from the object side to the image side a decentering lens unit A (LA) having a negative refractive power, an intermediate lens unit Lbw having a negative refractive power, and a decentering lens unit B (LB) having a negative refractive power.

Figure 11A:
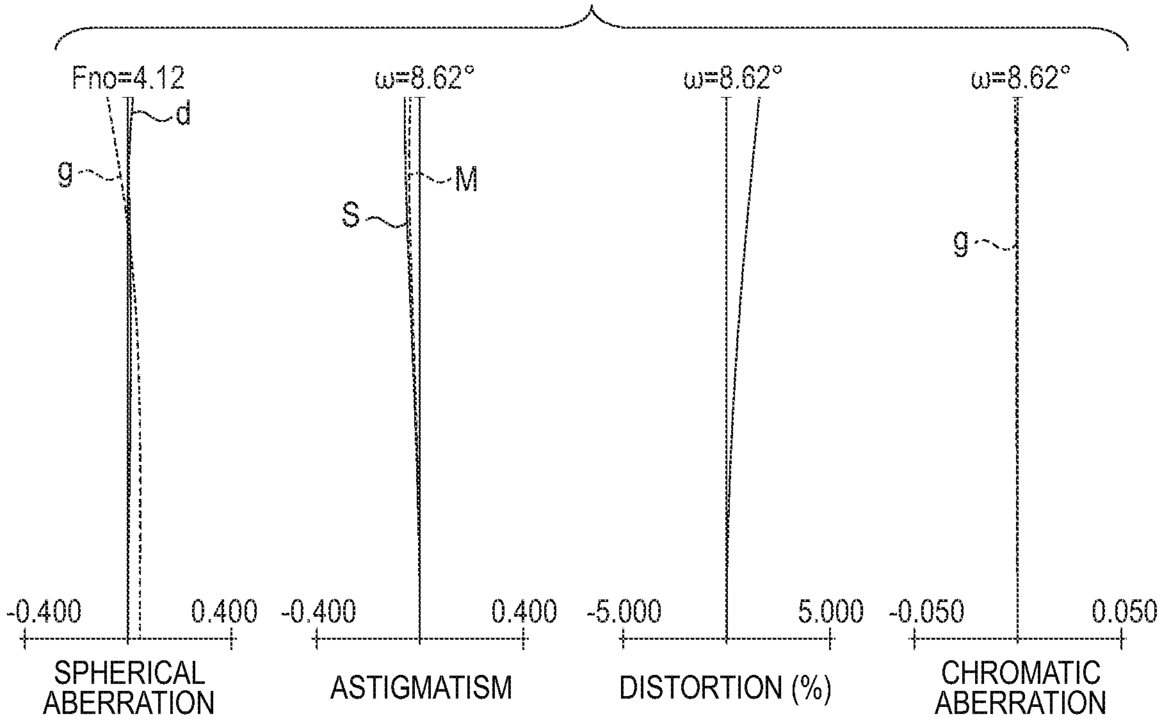
FIG. 11A is a longitudinal aberration diagram of the optical system of Embodiment 4 in normal image pickup with focusing at infinity.
Figure 11B:
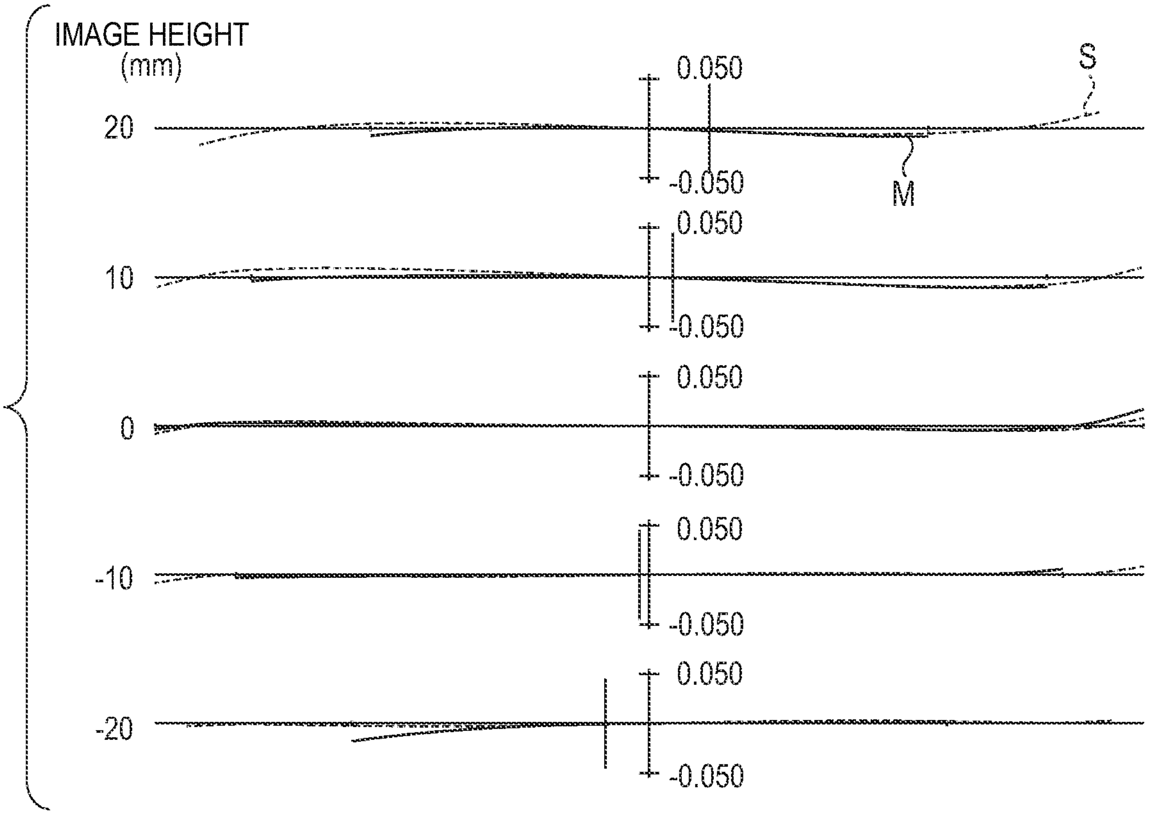
FIG. 11B is a lateral aberration diagram of the optical system of Embodiment 4 in tilt image pickup with focusing at a finite distance.
Figure 12:
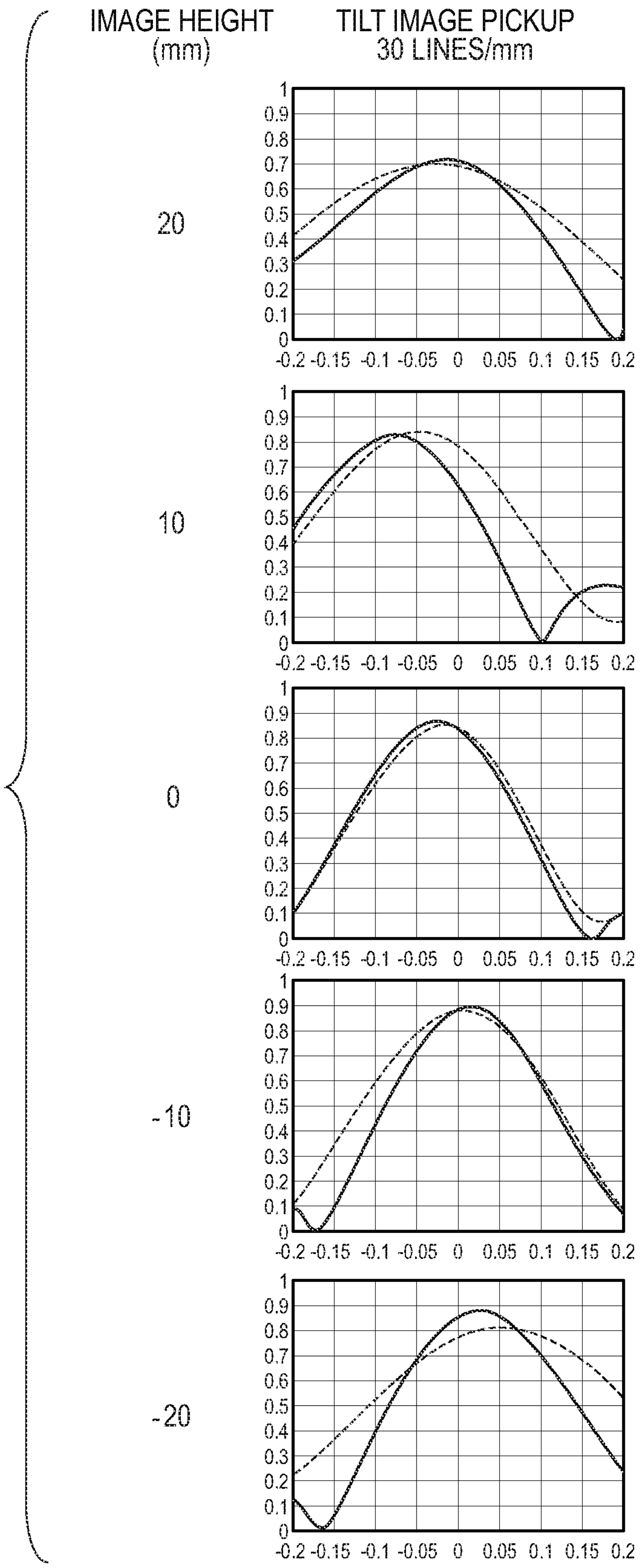
FIG. 12 is an MTF defocus characteristic diagram of the optical system of Embodiment 4 in tilt image pickup with focusing at a finite distance.
Figure 13A:
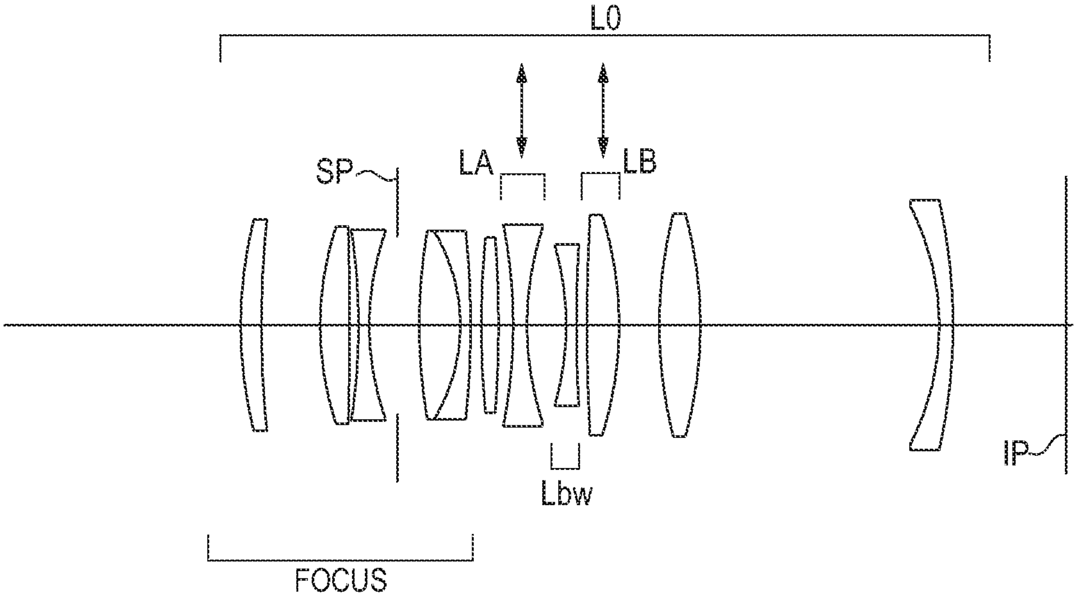
FIG. 13A is a cross sectional view of an optical system of Embodiment 5 in normal image pickup with focusing at infinity.
Figure 13B:
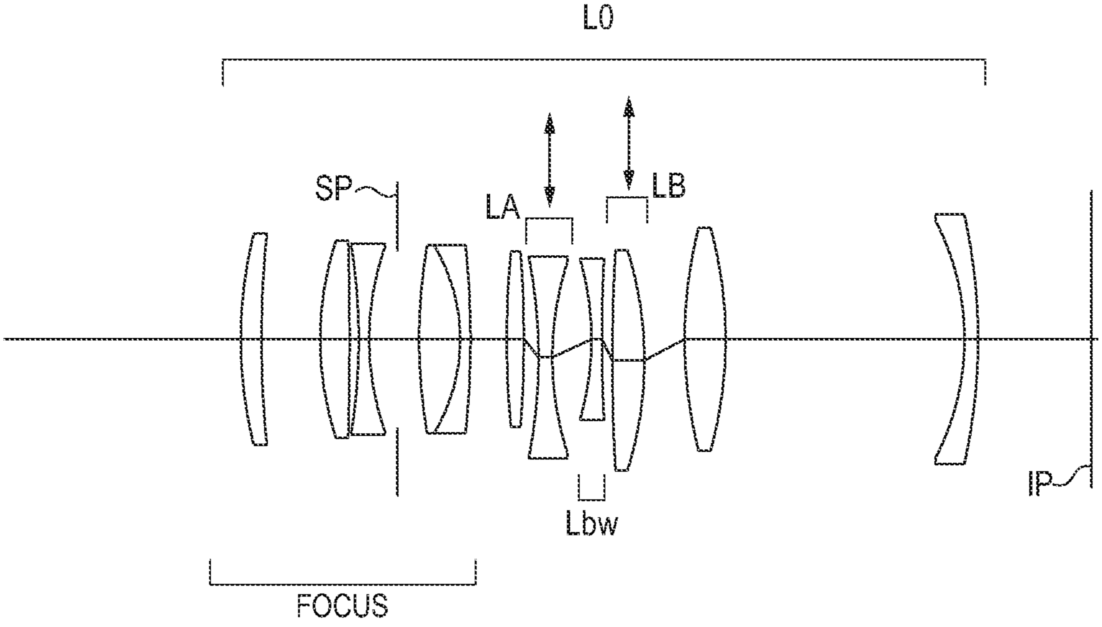
FIG. 13B is a cross sectional view of the optical system of Embodiment 5 in tilt image pickup with focusing at a finite distance.

A lateral aberration diagram shown in FIG. 11B and an MTF defocus characteristic shown in FIG. 12 show the performance during a tilt image pickup in a state where an object plane, located in a position, about 2000 mm away from the first surface of the optical system L0 in distance on the optical axis, tilted about 66 degrees to the optical axis direction of the image pickup optical system.

Embodiment 5

The optical system of Embodiment 5 includes in order from the object side to the image slice a decentering lens unit A (LA) having a negative refractive power, an intermediate lens unit Lbw having a negative refractive power, and a decentering lens unit B (LB) having a positive refractive power.

Figure 14A:
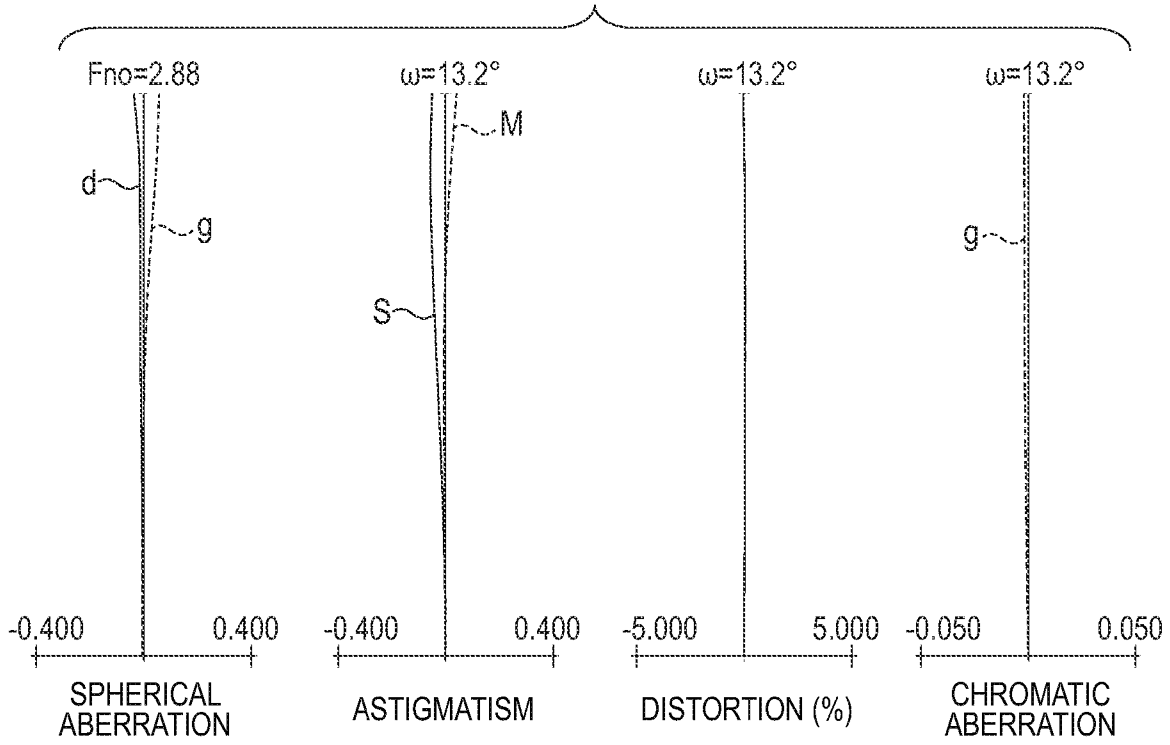
FIG. 14A is a longitudinal aberration diagram of the optical system of Embodiment 5 in normal image pickup with focusing at infinity.
Figure 14B:
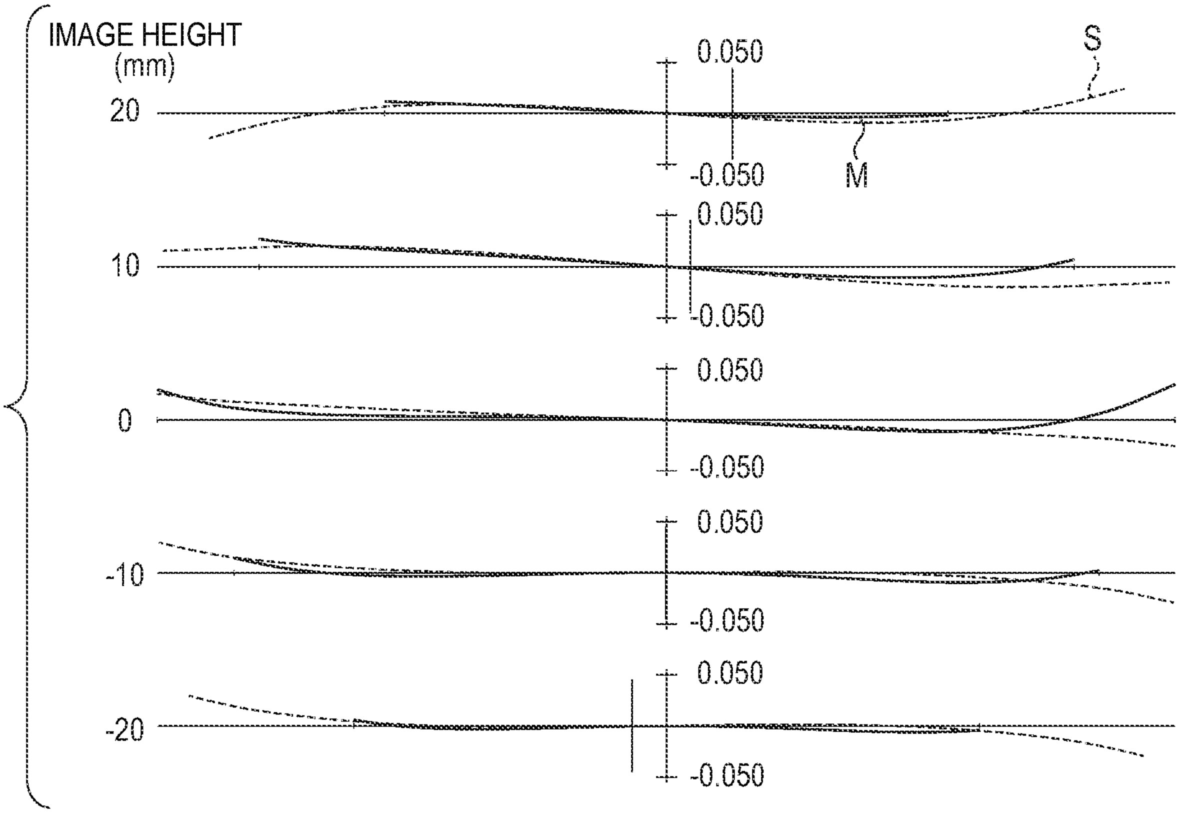
FIG. 14B is a lateral aberration diagram of the optical system of Embodiment 5 in tilt image pickup with focusing at a finite distance.
Figure 15:
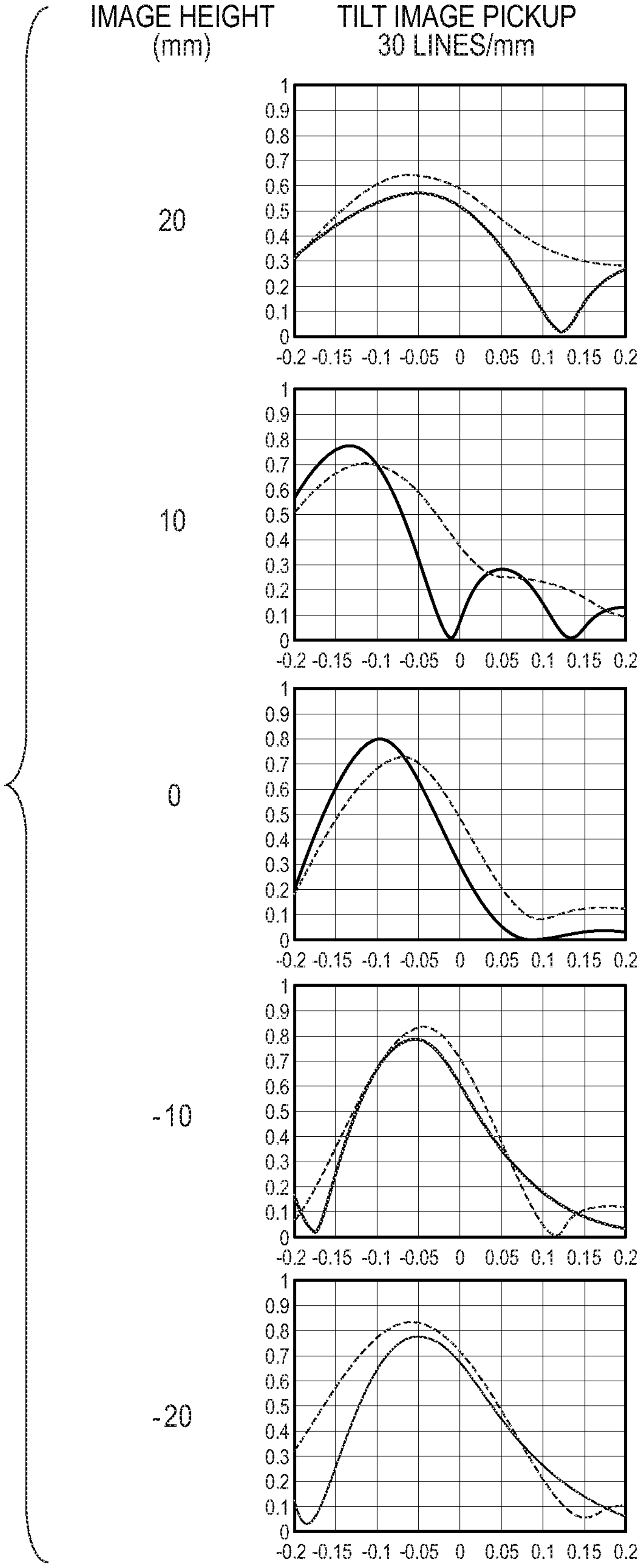
FIG. 15 is an MTF defocus characteristic diagram of the optical system of Embodiment 5 in tilt image pickup with focusing at a finite distance.
Figure 16A:
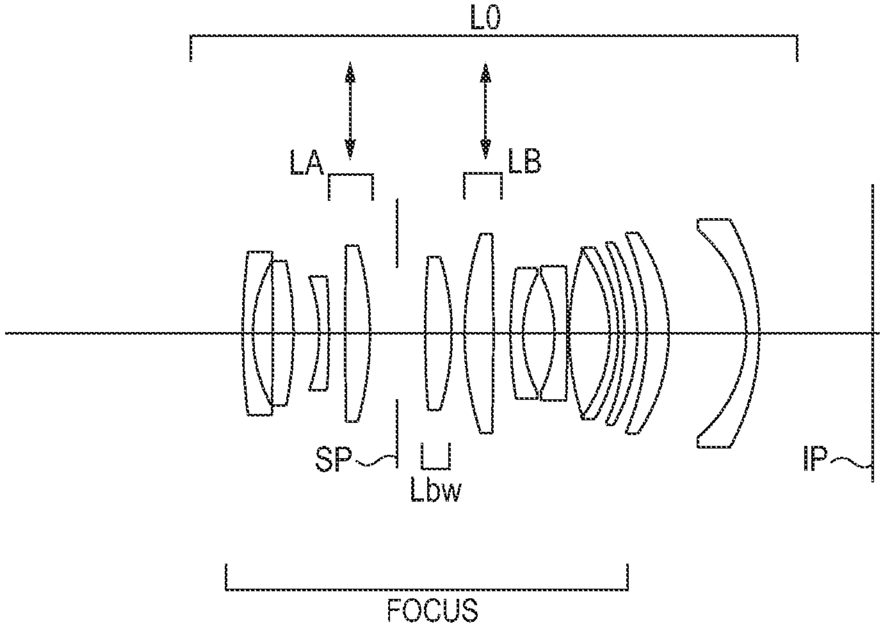
FIG. 16A is a cross sectional view of an optical system of Embodiment 6 in normal image pickup with focusing at infinity.
Figure 16B:
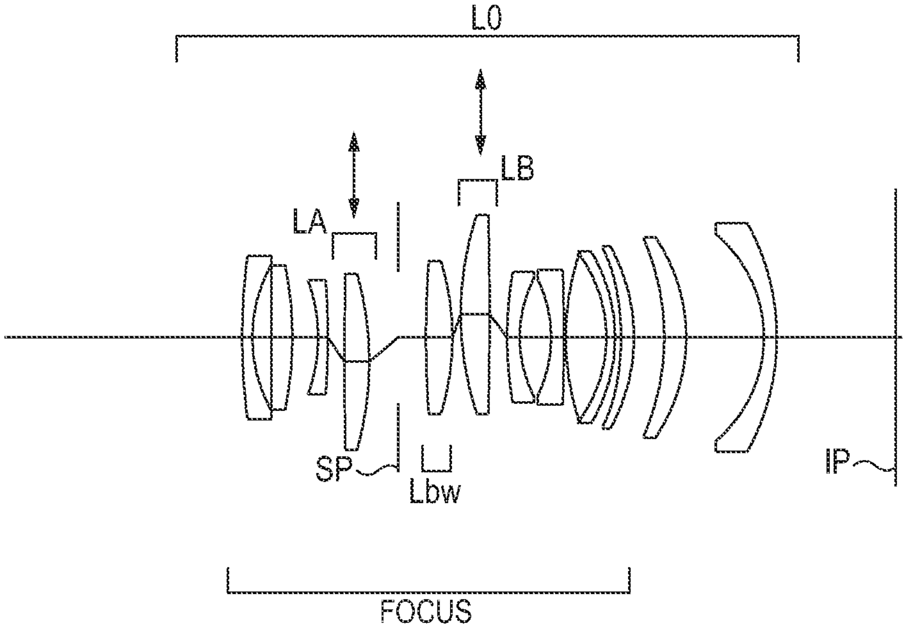
FIG. 16B is a cross sectional view of the optical system of Embodiment 6 in tilt image pickup with focusing at a finite distance.

A lateral aberration diagram shown in FIG. 14B and an MTF defocus characteristic shown in FIG. 15 show the performance during a tilt image pickup in a state where an object plane, located in a position, about 2000 mm away from the first surface of the optical system L0 in distance on the optical axis, tilted about 73 degrees to the optical axis direction of the image pickup optical system.

Embodiment 6

The optical system of Embodiment 6 includes in order from the object side to the image side a decentering lens unit A (LA) having a positive refractive power, an intermediate lens unit Lbw having a positive refractive power, and a decentering lens unit B (LB) having a positive refractive power.

Figure 17A:
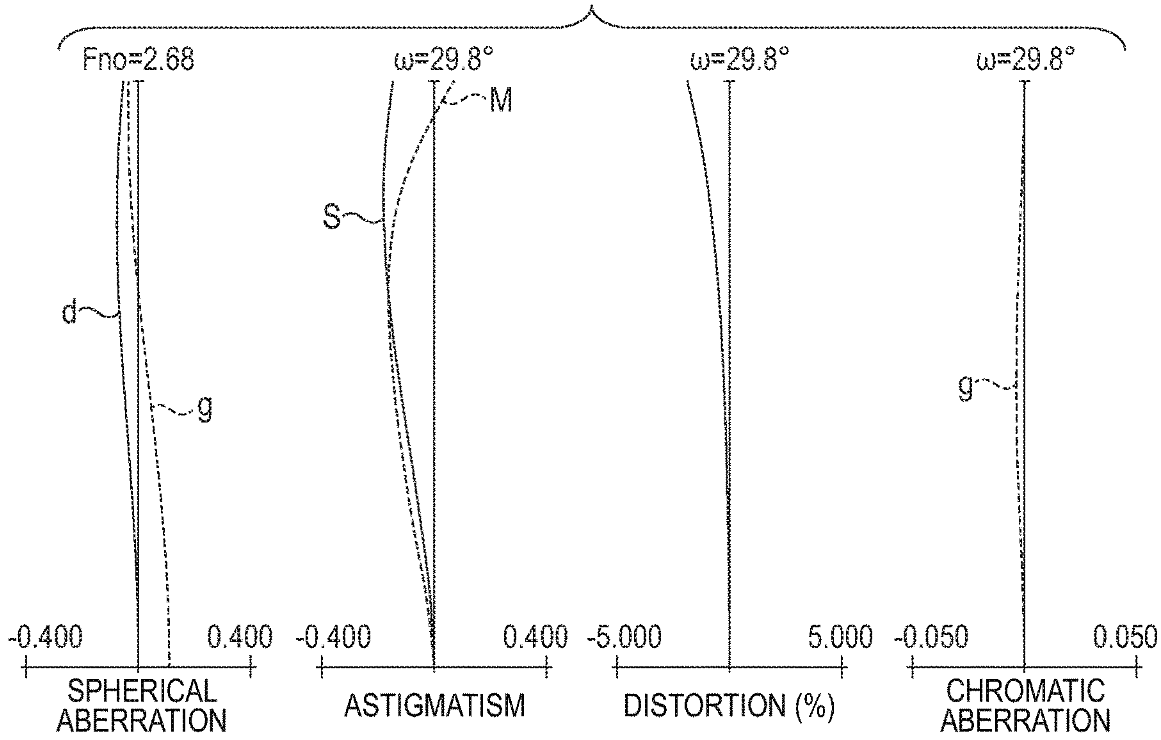
FIG. 17A shows a longitudinal aberration diagram of the optical system of Embodiment 6 in normal image pickup with focusing at infinity.
Figure 17B:
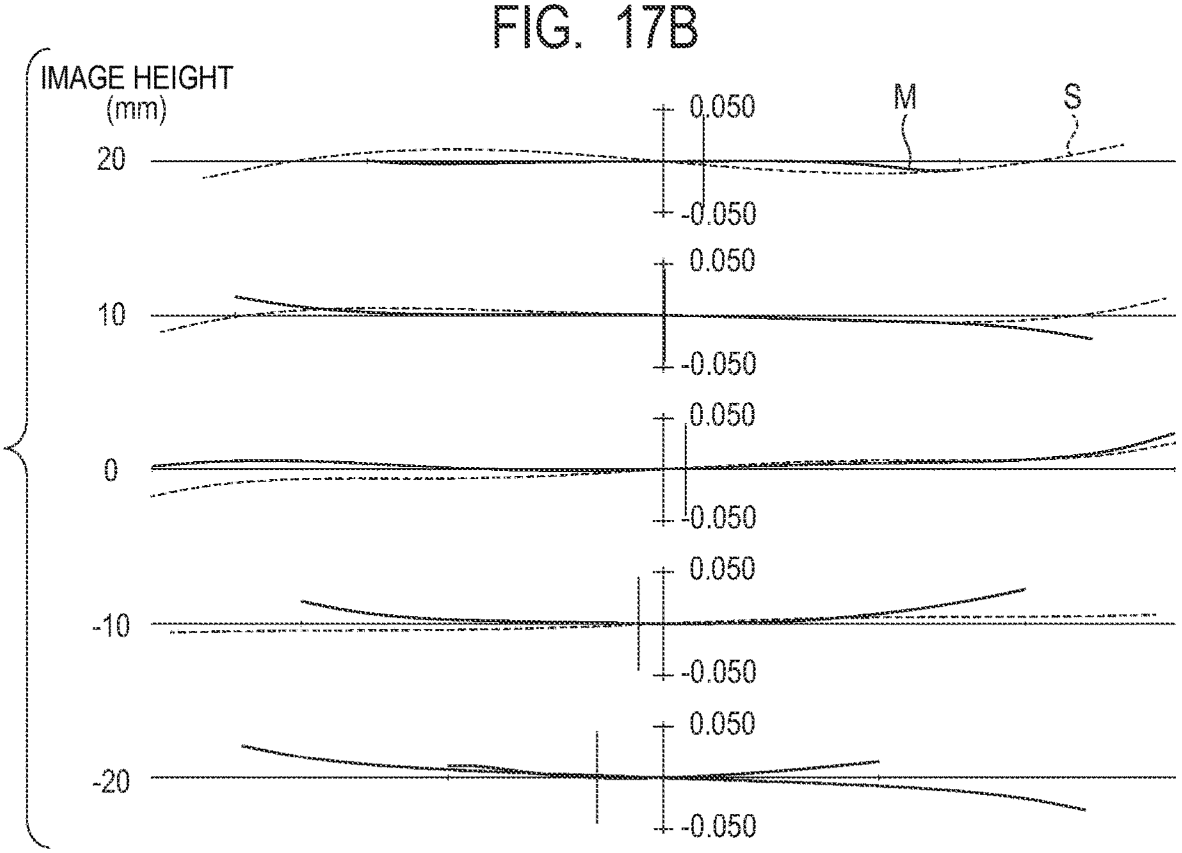
FIG. 17B is a lateral aberration diagram of the optical system of Embodiment 6 in tilt image pickup with focusing at a finite distance.
Figure 18:
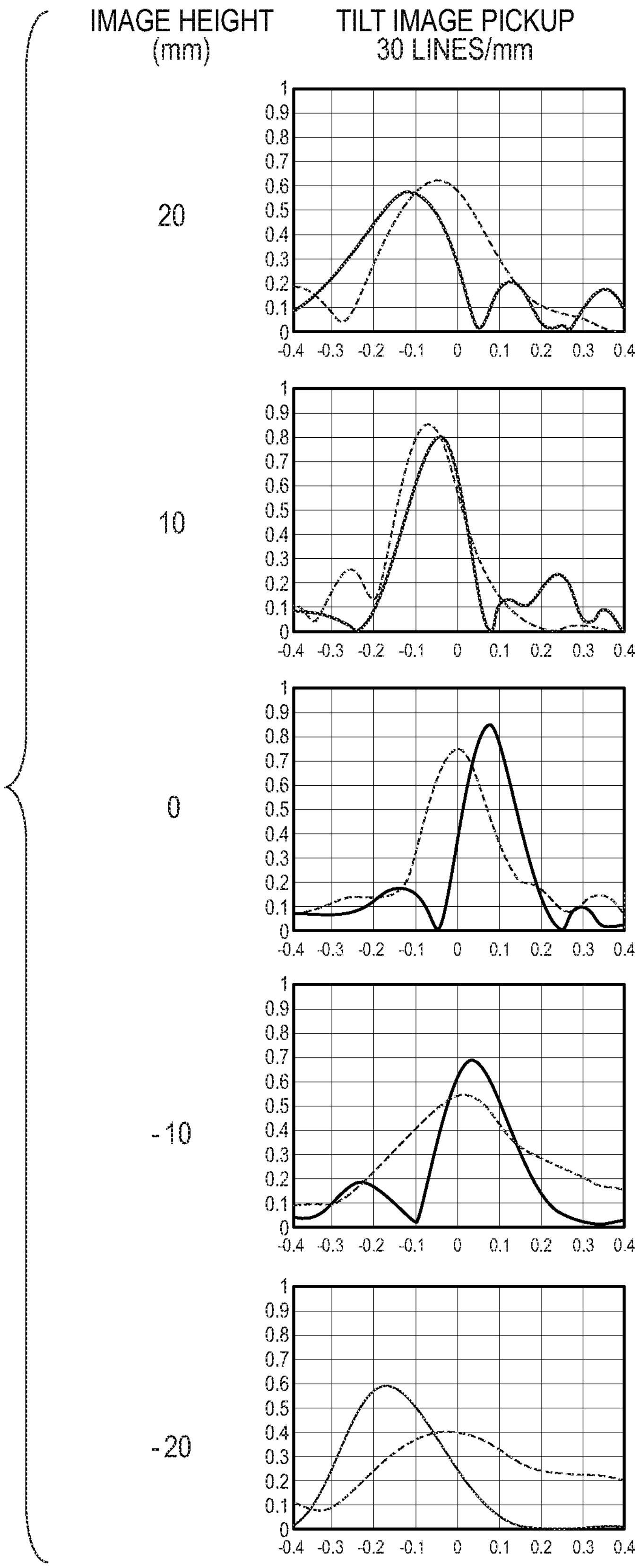
FIG. 18 is an MTF defocus characteristic diagram of the optical system of Embodiment 6 in tilt image pickup with focusing at a finite distance.
Figure 19A:
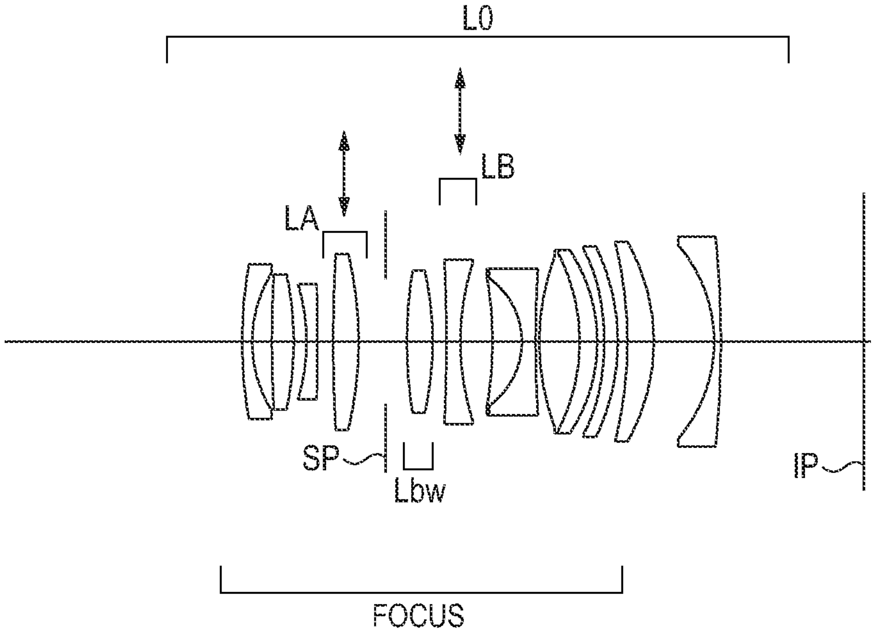
FIG. 19A is a cross sectional view of an optical system of Embodiment 7 in normal image pickup with focusing at infinity.
Figure 19B:
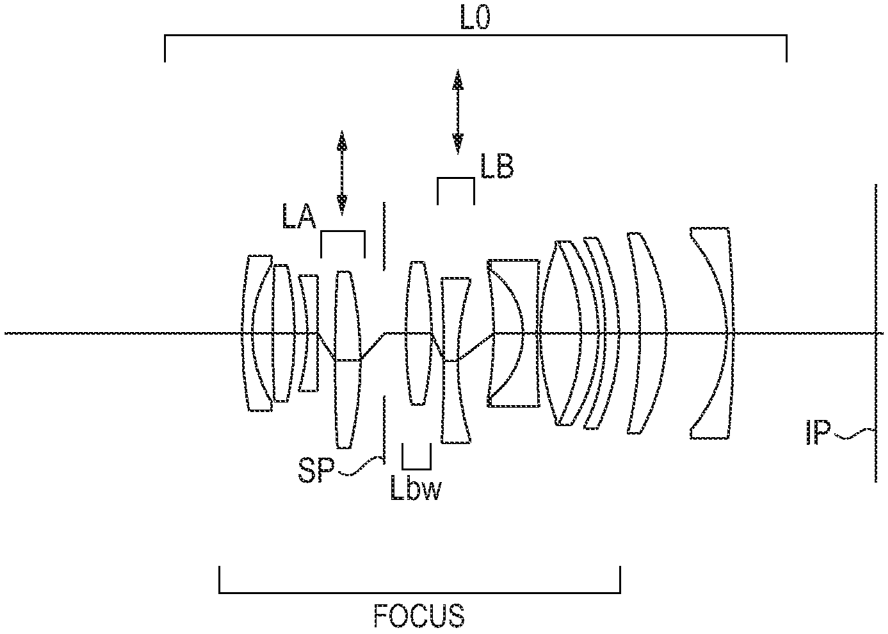
FIG. 19B is a cross sectional view of the optical system of Embodiment 7 in tilt image pickup with focusing at a finite distance.

A lateral aberration diagram shown in FIG. 17B and an MTF defocus characteristic shown in FIG. 18 show the performance during a tilt image pickup in a state where an object plane, located in a position, about 250 mm away from the first surface of the optical system L0 in distance on the optical axis, tilted about 53 degrees to the optical axis direction of the image pickup optical system.

Embodiment 7

The optical system of Embodiment 7 includes in order from the object side to the image side a decentering lens unit A (LA) having a positive refractive power, an intermediate lens unit Lbw having a positive refractive power, and a decentering lens unit B (LB) having a negative refractive power.

Figure 20A:
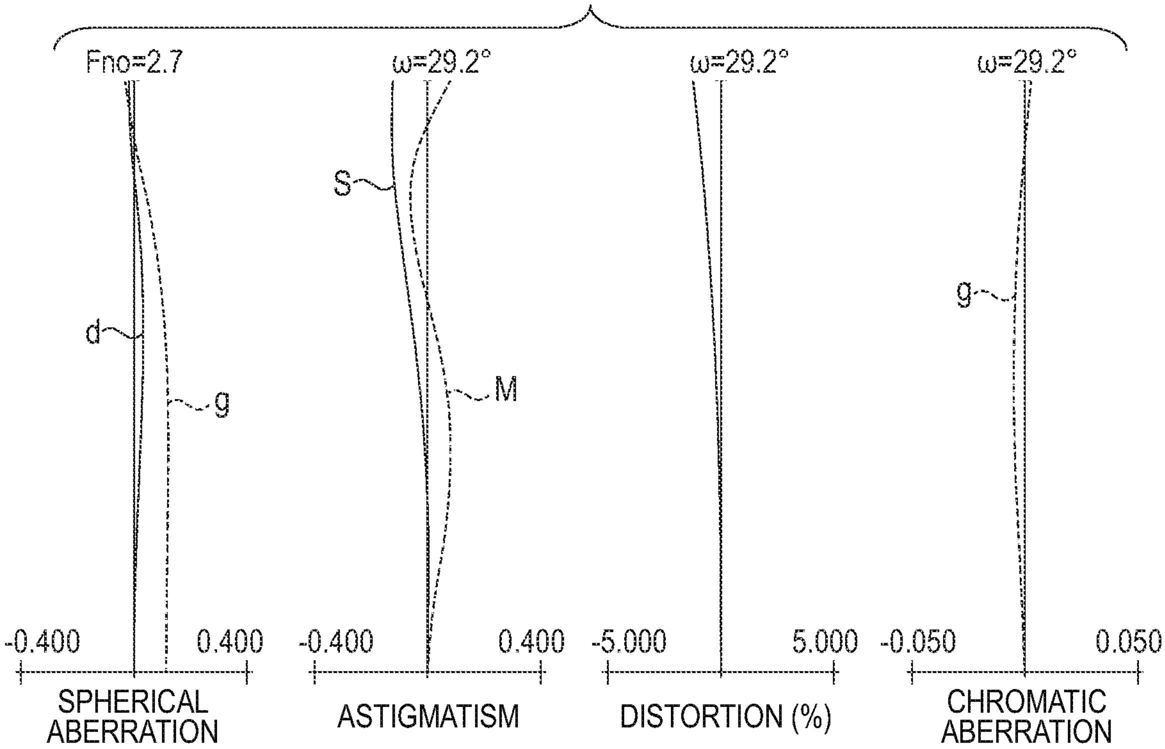
FIG. 20A is a longitudinal aberration diagram of the optical system of Embodiment 7 in normal image pickup with focusing at infinity.
Figure 20B:
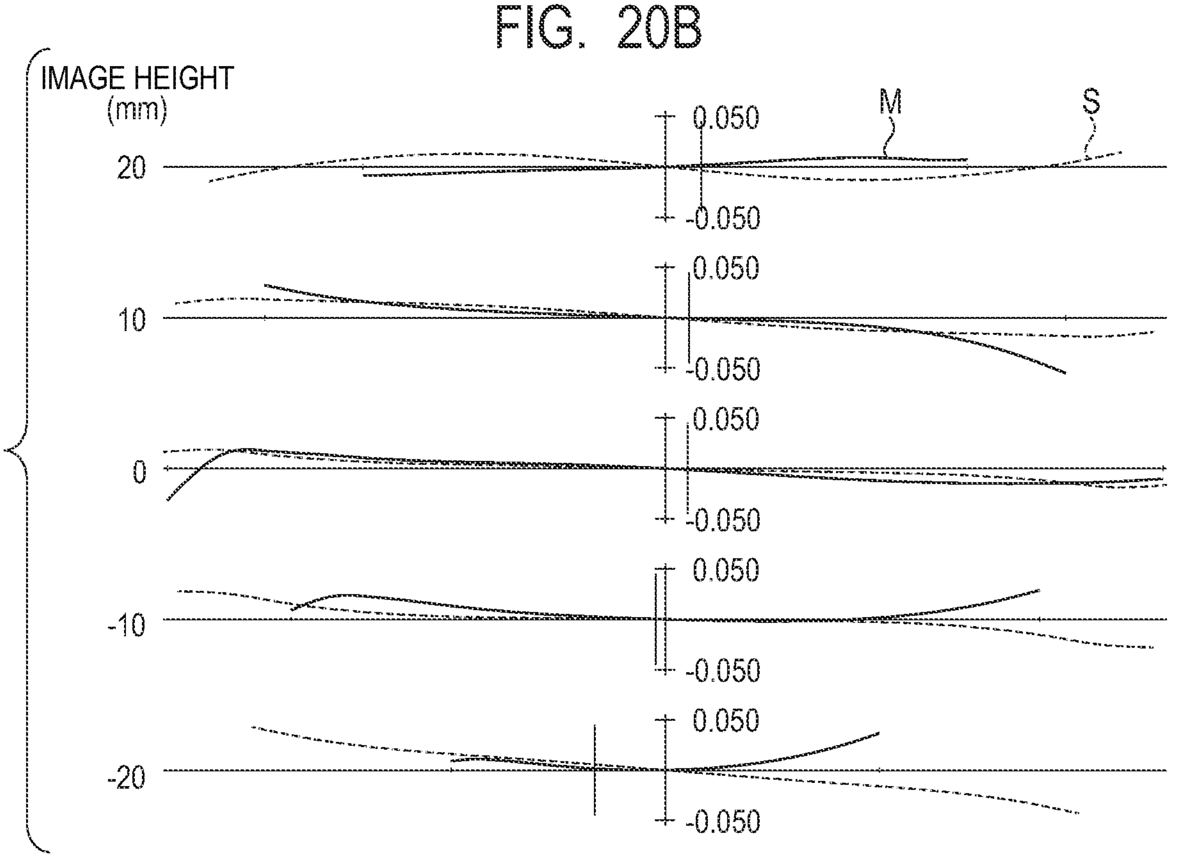
FIG. 20B is a lateral aberration diagram of the optical system of Embodiment 7 in tilt image pickup with focusing at a finite distance.
Figure 21:
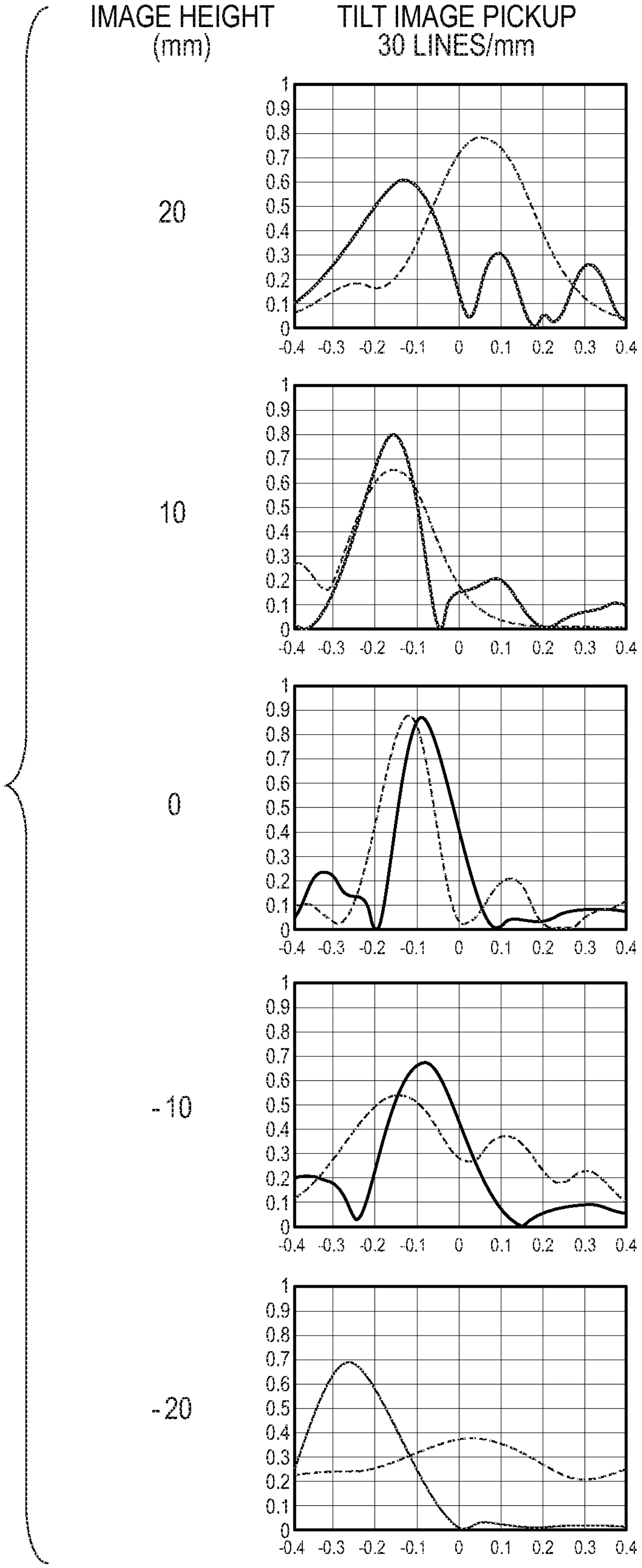
FIG. 21 is an MTF defocus characteristic diagram of the optical system of Embodiment 7 in tilt image pickup with focusing at a finite distance.
Figure 22:
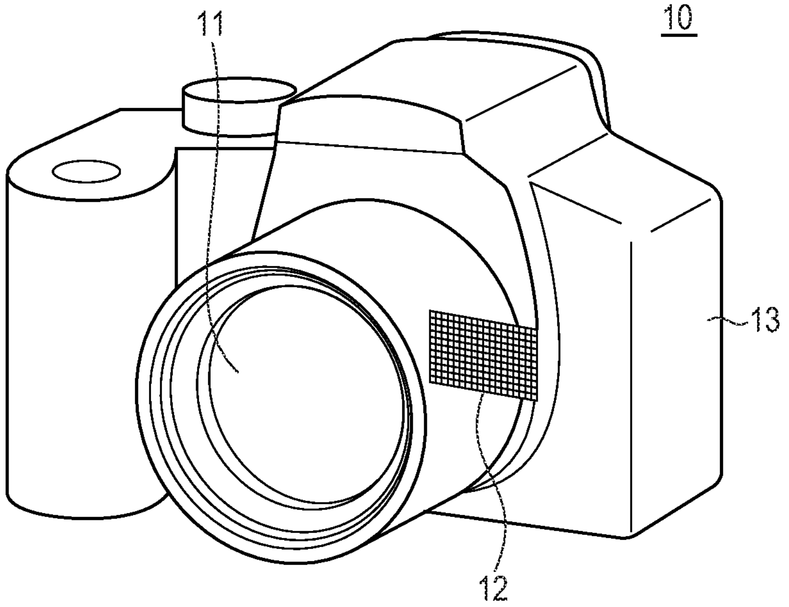
FIG. 22 is a schematic diagram of image pickup apparatus.

A lateral aberration diagram shown in FIG. 20B and an MTF defocus characteristic shown in FIG. 21 show the performance during a tilt image pickup in a state where an object plane, located in a position, about 500 mm away from the first surface of the optical system L0 in distance on the optical axis, tilted about 67 degrees to the optical axis direction of the image pickup optical system.

Numerical Embodiment

Hereinafter, Numerical Embodiments 1-7 corresponding respectively to Embodiments 1-7 are shown. In Numerical Embodiments 1-7, the surface number represents the order of the optical surface from the object side. "r" denotes a radius of curvature of the optical surface (mm), and "d" at surface number i denotes an interval between the i-th optical surface and the i+1-st optical surface (mm). "nd" and "vd" denote respectively refractive index for d-line and Abbe number with d-line as reference of medium (optical member) of the interval between the i-th optical surface and the i+1-st optical surface, as defined above. BF stands for back focus.

Effective diameter described in each of Numerical Embodiments 1-7 represent an effective diameter under a normal image pickup and not a tilt image pickup.

In the case where the optical surface is an aspherical surface, * is added to the right side of surface number. Aspherical surface shape is expressed by the following equation, $$x = (h^2/R)/\left[1+\left\{1(1+k)(h/R)^2\right\}^{1/2}\right] + A4\times h^4 + A6\times h^6 + A8\times h^8 + A10\times h^{10}$$

where X is a displacement amount from a surface vertex in the optical axis direction, h is the height from the optical axis, R is a paraxial radius of curvature, k is a conic constant, A4, A6, A8 and A10 are aspherical surface coefficients of respective order. "e±XX" in aspherical surface coefficient means$\times 10^{\pm XX}$.

Numerical Embodiment 1

Unit mm

Surface data

| Surface number | r | d | nd | vd | Effective diameter |
|---|---|---|---|---|---|
| 1 | 233.68400 | 3.49 | 1.49666 | 81.6 | 29.47 |
| 2 | −84.55300 | 0.75 | | | 29.40 |
| 3 | 49.48300 | 3.11 | 1.56541 | 43.8 | 28.40 |
| 4 | 104.50600 | 5.64 | | | 27.68 |
| 5 | −50.21700 | 1.30 | 1.79893 | 47.1 | 26.42 |
| 6 | −98.96500 | 1.12 | | | 26.46 |
| 7 (Stop) | ∞ | 1.56 | | | 26.08 |
| 8 | 194.07300 | 5.70 | 1.49686 | 81.6 | 25.71 |
| 9 | −23.77300 | 4.33 | 1.96694 | 31.2 | 25.44 |
| 10 | −33.33000 | 1.50 | | | 26.36 |
| 11 | −128.21800 | 2.00 | 1.62462 | 36.6 | 24.42 |
| 12 | 49.93700 | 5.24 | | | 23.45 |

-continued

| Unit mm | | | | | |
|---|---|---|---|---|---|
| 13 | −45.87700 | 1.35 | 1.99553 | 29.5 | 23.23 |
| 14 | −681.14600 | 3.44 | | | 23.81 |
| 15 | −71.63300 | 2.00 | 1.79791 | 47.2 | 24.78 |
| 16 | 552.89100 | 1.50 | | | 25.99 |
| 17 | 167.12500 | 5.36 | 1.98224 | 25.5 | 27.42 |
| 18 | −40.60900 | 0.80 | | | 28.04 |
| 19 | 43.92200 | 5.07 | 1.52189 | 77.6 | 29.03 |
| 20 | −184.56300 | 9.68 | | | 29.00 |
| 21 | −33.67000 | 1.50 | 1.97835 | 25.9 | 28.23 |
| 22 | −102.95200 | 2.15 | | | 29.62 |
| 23 | 120.48600 | 7.00 | 1.50119 | 80.9 | 31.74 |
| 24 | −38.02700 | 26.47 | | | 32.28 |
| 25 | −26.40500 | 1.50 | 1.84744 | 41.2 | 29.22 |
| 26 | −87.28800 | | | | 31.55 |
| Image plane | ∞ | | | | |

| | |
|---|---|
| Focal length | 84.99 |
| F-number | 2.88 |
| Half angle of view | 14.28 |
| Image height | 21.64 |
| Total lens length | 120.04 |
| BF | 16.49 |

Numerical Embodiment 2

Unit mm

Surface data

| Surface number | r | d | nd | vd | Effective diameter |
|---|---|---|---|---|---|
| 1 | 169.880 | 2.47 | 1.90243 | 28.6 | 29.47 |
| 2 | −294.655 | 2.42 | | | 29.35 |
| 3 | 56.139 | 2.99 | 1.49647 | 81.6 | 28.20 |
| 4 | 122.477 | 7.46 | | | 27.54 |
| 5 | −67.427 | 1.30 | 1.90608 | 27.8 | 25.38 |
| 6 | −204.309 | 3.95 | | | 25.35 |
| 7 (Stop) | ∞ | 1.34 | | | 24.72 |
| 8 | 115.786 | 5.36 | 1.49720 | 81.7 | 24.43 |
| 9 | −24.791 | 1.49 | 1.94976 | 32.3 | 24.17 |
| 10 | −34.807 | 1.50 | | | 24.49 |
| 11 | −127.254 | 2.00 | 1.96543 | 31.3 | 22.91 |
| 12 | 55.407 | 3.52 | 1.49664 | 81.5 | 22.36 |
| 13 | −230.312 | 3.56 | | | 22.21 |
| 14 | −38.003 | 1.30 | 2.00089 | 26.8 | 21.87 |
| 15 | −597.461 | 3.44 | | | 22.49 |
| 16 | −74.761 | 2.00 | 1.93485 | 33.3 | 23.57 |
| 17 | 141.322 | 2.50 | 1.72936 | 54.7 | 24.85 |
| 18 | −268.088 | 1.50 | | | 25.57 |
| 19 | −8757.500 | 4.83 | 2.00082 | 25.4 | 26.83 |
| 20 | −39.075 | 0.80 | | | 27.81 |
| 21 | 45.277 | 5.62 | 1.67644 | 32.3 | 30.69 |
| 22 | −118.620 | 14.69 | | | 30.64 |
| 23 | −34.620 | 1.50 | 1.83386 | 24.2 | 27.81 |
| 24 | 10044.010 | 1.14 | | | 29.03 |
| 25 | 140.757 | 7.00 | 1.49716 | 81.6 | 30.03 |
| 26 | −33.013 | 16.43 | | | 30.67 |
| 27 | −27.568 | 1.50 | 1.79054 | 47.8 | 28.77 |
| 28 | −204.124 | | | | 31.04 |
| Image plane | ∞ | | | | |

| | |
|---|---|
| Focal length | 84.99 |
| F-number | 2.88 |
| Half angle of view | 14.28 |
| Image height | 21.64 |
| Total lens length | 120.12 |
| BF | 16.49 |

Numerical Embodiment 3

Unit mm

Surface data

| Surface number | r | d | nd | vd | Effective diameter |
|---|---|---|---|---|---|
| 1 | 109.641 | 6.05 | 1.49699 | 84.7 | 57.53 |
| 2 | −548.554 | 2.21 | | | 57.09 |
| 3 | 135.263 | 7.02 | 1.49750 | 85.0 | 54.15 |
| 4 | −167.307 | 1.57 | | | 53.12 |
| 5 | −160.894 | 7.01 | 1.75516 | 51.7 | 51.76 |
| 6 | 1421.563 | 50.02 | | | 49.53 |
| 7 (Stop) | ∞ | 5.44 | | | 29.73 |
| 8 | 63.547 | 4.93 | 1.49627 | 83.5 | 26.99 |
| 9 | −46.639 | 1.86 | 1.92526 | 34.1 | 26.34 |
| 10 | −81.616 | 1.46 | | | 25.86 |
| 11 | 100.688 | 2.20 | 1.93633 | 33.3 | 23.68 |
| 12 | 44.665 | 4.14 | | | 22.34 |
| 13 | −48.730 | 1.41 | 2.00402 | 29.2 | 21.73 |
| 14 | 91.545 | 1.22 | | | 21.84 |
| 15 | 49.364 | 1.20 | 1.81179 | 41.2 | 22.43 |
| 16 | 29.278 | 3.67 | 1.84683 | 23.7 | 22.34 |
| 17 | 114.544 | 3.43 | | | 22.24 |
| 18 | −69.247 | 1.37 | 1.82078 | 44.5 | 22.36 |
| 19 | 103.757 | 3.30 | | | 22.89 |
| 20 | −44.103 | 1.88 | 1.92015 | 34.6 | 23.47 |
| 21 | ∞ | 1.14 | | | 25.36 |
| 22 | 129.405 | 7.40 | 1.66018 | 36.6 | 27.55 |
| 23 | −26.828 | 0.96 | | | 28.85 |
| 24 | 53.821 | 7.02 | 1.74935 | 27.5 | 31.22 |
| 25 | −100.232 | 7.24 | | | 31.16 |
| 26 | −32.032 | 1.42 | 2.00278 | 25.5 | 29.89 |
| 27 | −134.744 | 0.98 | | | 31.52 |
| 28 | 185.026 | 7.01 | 1.49558 | 81.7 | 32.96 |
| 29 | −39.709 | 50.01 | | | 33.70 |
| 30 | −25.328 | 1.46 | 2.00029 | 25.4 | 33.02 |
| 31 | −28.866 | | | | 34.49 |
| Image plane | ∞ | | | | |

| | |
|---|---|
| Focal length | 229.54 |
| F-number | 4.12 |
| Half angle of view | 5.38 |
| Image height | 21.64 |
| Total lens length | 240.00 |
| BF | 44.00 |

Numerical Embodiment 4

Unit mm

Surface data

| Surface number | r | d | nd | vd | Effective diameter |
|---|---|---|---|---|---|
| 1 | 118.074 | 4.63 | 1.49705 | 81.7 | 32.04 |
| 2 | −118.018 | 0.50 | | | 31.81 |
| 3 | 56.147 | 4.25 | 1.49699 | 81.6 | 30.79 |
| 4 | −1315.470 | 2.33 | | | 30.04 |
| 5 | −124.228 | 1.30 | 1.80028 | 45.7 | 29.13 |
| 6 | 263.930 | 17.25 | | | 28.62 |
| 7 (Stop) | ∞ | 1.49 | | | 23.92 |
| 8 | 141.157 | 4.45 | 1.49917 | 81.3 | 23.37 |
| 9 | −29.035 | 1.75 | 1.85527 | 39.5 | 22.99 |
| 10 | −44.953 | 1.50 | | | 22.93 |
| 11 | −133.399 | 2.00 | 1.74301 | 31.0 | 21.58 |
| 12 | 56.852 | 3.87 | | | 20.82 |
| 13 | −57.441 | 1.30 | 1.98240 | 30.2 | 20.60 |
| 14 | 717.229 | 3.43 | | | 20.88 |
| 15 | −69.333 | 2.00 | 1.86828 | 39.0 | 21.57 |
| 16 | 539.412 | 1.63 | | | 22.44 |

-continued

| Unit mm | | | | | |
|---|---|---|---|---|---|
| 17 | 174.122 | 4.69 | 1.79272 | 26.8 | 23.60 |
| 18 | −35.275 | 2.10 | | | 24.17 |
| 19 | 51.343 | 7.00 | 1.83690 | 42.4 | 23.61 |
| 20 | 461.238 | 23.95 | | | 22.07 |
| 21 | −39.555 | 1.55 | 1.98302 | 28.8 | 22.27 |
| 22 | 296.008 | 1.14 | | | 23.29 |
| 23 | 69.197 | 7.00 | 1.57417 | 42.6 | 24.72 |
| 24 | −76.652 | 20.40 | | | 26.08 |
| 25 | −30.886 | 1.50 | 1.84661 | 23.8 | 30.48 |
| 26 | −48.112 | | | | 32.22 |
| Image plane | ∞ | | | | |

| | |
|---|---|
| Focal length | 131.99 |
| F-number | 4.12 |
| Half angle of view | 9.31 |
| Image height | 21.64 |
| Total lens length | 139.49 |
| BF | 16.50 |

Numerical Embodiment 5

Unit mm

Surface data

| Surface number | r | d | nd | vd | Effective diameter |
|---|---|---|---|---|---|
| 1 | 62.366 | 3.00 | 1.61748 | 65.3 | 29.47 |
| 2 | 144.183 | 8.56 | | | 29.11 |
| 3 | 45.333 | 4.31 | 1.49758 | 82.1 | 27.39 |
| 4 | −464.718 | 1.33 | | | 26.74 |
| 5 | −86.220 | 1.50 | 1.59076 | 40.3 | 26.48 |
| 6 | 39.991 | 4.11 | | | 25.56 |
| 7 (Stop) | ∞ | 3.17 | | | 25.72 |
| 8 | 79.012 | 6.03 | 1.68714 | 58.4 | 26.05 |
| 9 | −26.163 | 1.50 | 1.61743 | 60.7 | 25.91 |
| 10 | −120.376 | 1.49 | | | 25.29 |
| 11 | 122.946 | 2.55 | 1.95009 | 24.9 | 24.26 |
| 12 | −159.457 | 2.14 | | | 23.83 |
| 13 | −74.419 | 1.97 | 1.69838 | 30.1 | 22.53 |
| 14 | 44.411 | 5.73 | | | 21.37 |
| 15 | −41.084 | 1.49 | 1.89383 | 36.7 | 20.95 |
| 16 | 209.150 | 1.51 | | | 21.50 |
| 17 | 269.634 | 4.72 | 1.93837 | 33.1 | 22.14 |
| 18 | −52.635 | 5.81 | | | 23.67 |
| 19 | 64.651 | 6.01 | 1.49678 | 82.3 | 29.01 |
| 20 | −60.283 | 34.77 | | | 29.58 |
| 21 | −37.306 | 1.99 | 1.78596 | 25.5 | 32.51 |
| 22 | −81.756 | | | | 34.32 |
| Image plane | ∞ | | | | |

| | |
|---|---|
| Focal length | 84.99 |
| F-number | 2.88 |
| Half angle of view | 14.28 |
| Image height | 21.64 |
| Total lens length | 120.15 |
| BF | 16.48 |

Numerical Embodiment 6

Unit mm

Surface data

| Surface number | r | d | nd | vd | Effective diameter |
|---|---|---|---|---|---|
| 1 | 85.204 | 1.49 | 1.75305 | 52.0 | 22.57 |
| 2 | 21.524 | 2.93 | | | 20.03 |
| 3 | −632.533 | 3.05 | 2.00137 | 27.8 | 19.81 |

-continued

| Unit mm | | | | | |
|---|---|---|---|---|---|
| 4 | −49.167 | 3.72 | | | 19.21 |
| 5 | −23.702 | 1.40 | 1.89114 | 20.3 | 15.36 |
| 6 | −107.284 | 2.35 | | | 15.18 |
| 7 | 630.681 | 3.65 | 1.98981 | 29.9 | 16.81 |
| 8 | −46.284 | 3.95 | | | 17.58 |
| 9 (Stop) | ∞ | 4.05 | | | 18.43 |
| 10 | 140.520 | 3.89 | 1.49687 | 82.0 | 19.21 |
| 11 | −37.137 | 1.84 | | | 19.38 |
| 12 | 45.522 | 4.23 | 1.97314 | 31.0 | 18.71 |
| 13 | −493.733 | 2.44 | | | 17.80 |
| 14 | 52.744 | 1.85 | 1.60381 | 40.5 | 15.84 |
| 15 | 18.661 | 4.61 | | | 14.64 |
| 16 | −19.108 | 1.86 | 1.81934 | 24.9 | 15.67 |
| 17 | −250.571 | 0.25 | | | 18.38 |
| 18* | 39.902 | 5.96 | 1.50305 | 82.1 | 22.06 |
| 19 | −20.278 | 1.24 | 1.68616 | 30.8 | 22.63 |
| 20 | −24.003 | 0.85 | | | 23.74 |
| 21* | −39.991 | 1.92 | 1.94168 | 33.1 | 24.48 |
| 22 | −26.925 | 1.36 | | | 25.23 |
| 23 | −35.312 | 3.17 | 1.50175 | 81.2 | 27.06 |
| 24 | −25.878 | 11.32 | | | 27.91 |
| 25 | −19.673 | 1.87 | 1.51098 | 58.7 | 28.85 |
| 26 | −34.236 | | | | 31.89 |
| Image plane | ∞ | | | | |

Aspherical surface data

Eighteenth surface

K = 0.00000e+000 A4 = 6.09563e−006 A6 = −6.67684e−008
A8 = 5.30827e−010 A10 = −1.28831e−012

Twenty-first surface

K = 0.00000e+000 A4 = −1.35638e−005 A6 = −2.09828e−008
A8 = 5.63383e−011 A10 = −6.19522e−013

| | |
|---|---|
| Focal length | 34.87 |
| F-number | 2.68 |
| Half angle of view | 31.82 |
| Image height | 21.64 |
| Total lens length | 91.74 |
| BF | 16.48 |

Numerical Embodiment 7

Unit mm

Surface data

| Surface number | r | d | nd | vd | Effective diameter |
|---|---|---|---|---|---|
| 1 | 60.601 | 1.48 | 1.73122 | 54.5 | 21.33 |
| 2 | 19.002 | 2.90 | | | 18.85 |
| 3 | 175.708 | 3.22 | 1.90475 | 27.0 | 18.46 |
| 4 | −44.186 | 1.84 | | | 17.71 |
| 5 | −28.498 | 1.50 | 1.92306 | 20.9 | 15.53 |
| 6 | −1621.147 | 2.36 | | | 14.87 |
| 7 | 223.118 | 3.72 | 1.95567 | 31.9 | 16.01 |
| 8 | −54.278 | 3.89 | | | 16.71 |
| 9 (Stop) | ∞ | 3.11 | | | 17.47 |
| 10 | 62.581 | 3.78 | 1.95024 | 32.3 | 18.11 |
| 11 | −47.175 | 2.02 | | | 17.98 |
| 12 | −215.898 | 2.00 | 1.73062 | 28.5 | 16.60 |
| 13 | 37.088 | 4.73 | | | 15.84 |
| 14 | −51.553 | 4.25 | 1.49856 | 81.7 | 15.44 |
| 15 | −11.430 | 2.00 | 1.62687 | 36.3 | 15.94 |
| 16 | 178.922 | 0.50 | | | 20.10 |
| 17* | 32.576 | 5.94 | 1.49696 | 81.7 | 23.65 |
| 18 | −27.819 | 2.55 | 2.00083 | 25.5 | 24.24 |

-continued

| Unit mm | | | | | |
|---|---|---|---|---|---|
| 19 | −24.108 | 1.00 | | | 25.34 |
| 20* | −36.587 | 2.00 | 1.92759 | 33.9 | 25.53 |
| 21 | −31.471 | 1.38 | | | 26.46 |
| 22 | −59.334 | 3.87 | 1.49724 | 81.6 | 27.27 |
| 23 | −29.232 | 8.77 | | | 27.80 |
| 24 | −21.535 | 1.00 | 1.57470 | 49.5 | 26.90 |
| 25 | −144.181 | | | | 29.29 |
| Image plane | ∞ | | | | |

Aspherical surface data

Seventeenth surface

K = 0.00000e+000 A4 = −1.31063e−005 A6 = 2.43229e−008
A8 = 1.15265e−010 A10 = −4.05893e−013

-continued

Unit mm

Twentieth surface

K = 0.00000e+000 A4 = −9.87225e−006 A6 = −5.90682e−009
A8 = −5.30564e−011 A10 = −3.11497e−013

| | |
|---|---|
| Focal length | 35.83 |
| F-number | 2.72 |
| Half angle of view | 31.13 |
| Image height | 21.64 |
| Total lens length | 90.57 |
| BF | 20.80 |

The various values for each Numerical Embodiment are summarized in Table 1 below.

TABLE 1

| Conditional Expression | | Embodiment 1 | 2 | 3 | 4 | 5 | 6 | 7 |
|---|---|---|---|---|---|---|---|---|
| (1) | \|Pa\| + \|Pb\| | 1.51 | 0.90 | 9.98 | 2.41 | 2.19 | 0.81 | 0.88 |
| (2) | $(Ma_{max} \times fa)/(Mb_{max} \times fb)$ | −0.54 | −0.66 | −0.94 | −0.59 | −0.72 | −1.07 | −1.04 |
| (3) | Lbk/f | 0.19 | 0.19 | 0.19 | 0.12 | 0.19 | 0.47 | 0.58 |
| (4) | \|Pa\|/\|Pb\| | 1.54 | 0.99 | 1.00 | 1.41 | 1.34 | 0.97 | 0.84 |
| (5) | $(Ma_{max} \times PEa)/(Mb_{max} \times PEb)$ | 0.74 | 0.86 | 0.21 | 0.91 | 1.31 | 1.58 | 1.58 |
| (6) | \|(IIIEa × Sb) − (IIIEb × Sa)\| | 0.10 | 0.02 | 5.79 | 0.24 | 0.09 | 0.07 | 0.01 |
| (7) | \|(IIEa × Sb) − (IIEb × Sa)\| | 0.01 | 0.02 | 2.25 | 0.23 | 0.45 | 0.15 | 0.18 |
| (8) | βa × βbw | −1.50 | −1.35 | −11.74 | −2.13 | −1.80 | −2.38 | −0.83 |
| (9) | \|fa\|/f | 0.67 | 0.85 | 0.098 | 0.40 | 0.47 | 1.25 | 1.28 |
| (10) | \|fb\|/f | 0.93 | 1.05 | 0.103 | 0.54 | 0.56 | 1.23 | 1.21 |
| (11) | \|LshA/Lopt\| | 0.13 | 0.13 | 0.09 | 0.08 | 0.16 | 0.08 | 0.08 |
| (12) | \|LshB/Lopt\| | 0.23 | 0.23 | 0.16 | 0.16 | 0.27 | 0.15 | 0.12 |
| (13) | $\|Ma_{max}\|/\varphi a$ | 0.08 | 0.16 | 0.06 | 0.11 | 0.12 | 0.20 | 0.16 |
| (14) | $\|Mb_{max}\|/\varphi b$ | 0.10 | 0.18 | 0.05 | 0.13 | 0.13 | 0.18 | 0.18 |
| (15) | Lopt/f | 1.40 | 1.41 | 1.05 | 1.06 | 1.41 | 2.63 | 2.53 |
| (16) | fa/fbw | 1.15 | 1.78 | −0.24 | 0.99 | 1.03 | 0.73 | 1.60 |
| | Pa | −0.91 | −0.45 | −5.00 | −1.41 | −1.26 | 0.40 | 0.40 |
| | Pb | −0.59 | −0.45 | −4.99 | −1.00 | 0.93 | 0.41 | −0.48 |
| | fa | −57.02 | −72.16 | −22.51 | −53.41 | −39.56 | 43.68 | 45.96 |
| | fb | −79.44 | −89.55 | −23.67 | −70.65 | 47.27 | 43.00 | -43.17 |
| | $Ma_{max}$ | −2.32 | −3.68 | −1.31 | −2.33 | −2.64 | −3.54 | −3.90 |
| | $Mb_{max}$ | 3.11 | 4.52 | 1.33 | 3.01 | −3.05 | 3.37 | −3.99 |
| | Lbk | 16.49 | 16.49 | 44.00 | 16.50 | 16.48 | 16.48 | 20.80 |
| | f | 84.99 | 84.99 | 229.54 | 131.99 | 84.99 | 34.87 | 35.78 |
| | PEa | 1.64 | 1.16 | 4.95 | 3.71 | 2.31 | 0.97 | 0.81 |
| | PEb | −1.66 | −1.10 | −23.74 | −3.18 | 1.52 | −0.65 | 0.50 |
| | Sa | −1.17 | −0.89 | −3.85 | −1.59 | −1.56 | 1.05 | 0.97 |
| | Sb | −0.87 | −0.72 | −3.80 | −1.23 | 1.35 | 1.10 | −0.95 |
| | IIIEa | −0.16 | −0.36 | 4.00 | −1.19 | −0.56 | −0.14 | −0.48 |
| | IIIEb | −0.21 | −0.31 | 2.44 | −1.07 | 0.55 | −0.21 | 0.46 |
| | IIEa | 2.55 | 2.28 | 10.22 | 5.88 | 4.34 | −0.82 | −0.97 |
| | IIEb | 1.91 | 1.88 | 9.49 | 4.68 | −4.04 | −0.71 | 0.76 |
| | βa | 4.64 | 2.83 | −2.33 | 3.99 | 4.61 | 4.98 | 5.96 |
| | βbw | −0.32 | −0.48 | 5.04 | −0.53 | −0.39 | −0.48 | −0.14 |
| | LshA | 15.07 | 15.22 | 21.44 | 11.19 | 18.83 | 7.60 | 7.60 |
| | LshB | 27.01 | 28.02 | 37.50 | 21.79 | 32.29 | 14.01 | 10.97 |
| | Lopt | 118.69 | 120.12 | 240.00 | 139.49 | 120.15 | 91.74 | 90.55 |
| | φa | 29.11 | 22.91 | 23.68 | 21.62 | 22.53 | 17.58 | 24.36 |
| | φb | 31.40 | 24.85 | 25.36 | 22.49 | 23.67 | 18.79 | 22.68 |
| | fbw | −49.46 | −40.60 | 94.56 | −54.09 | −38.31 | 59.55 | 28.77 |

Embodiment of Image Pickup Apparatus

Figure 24:
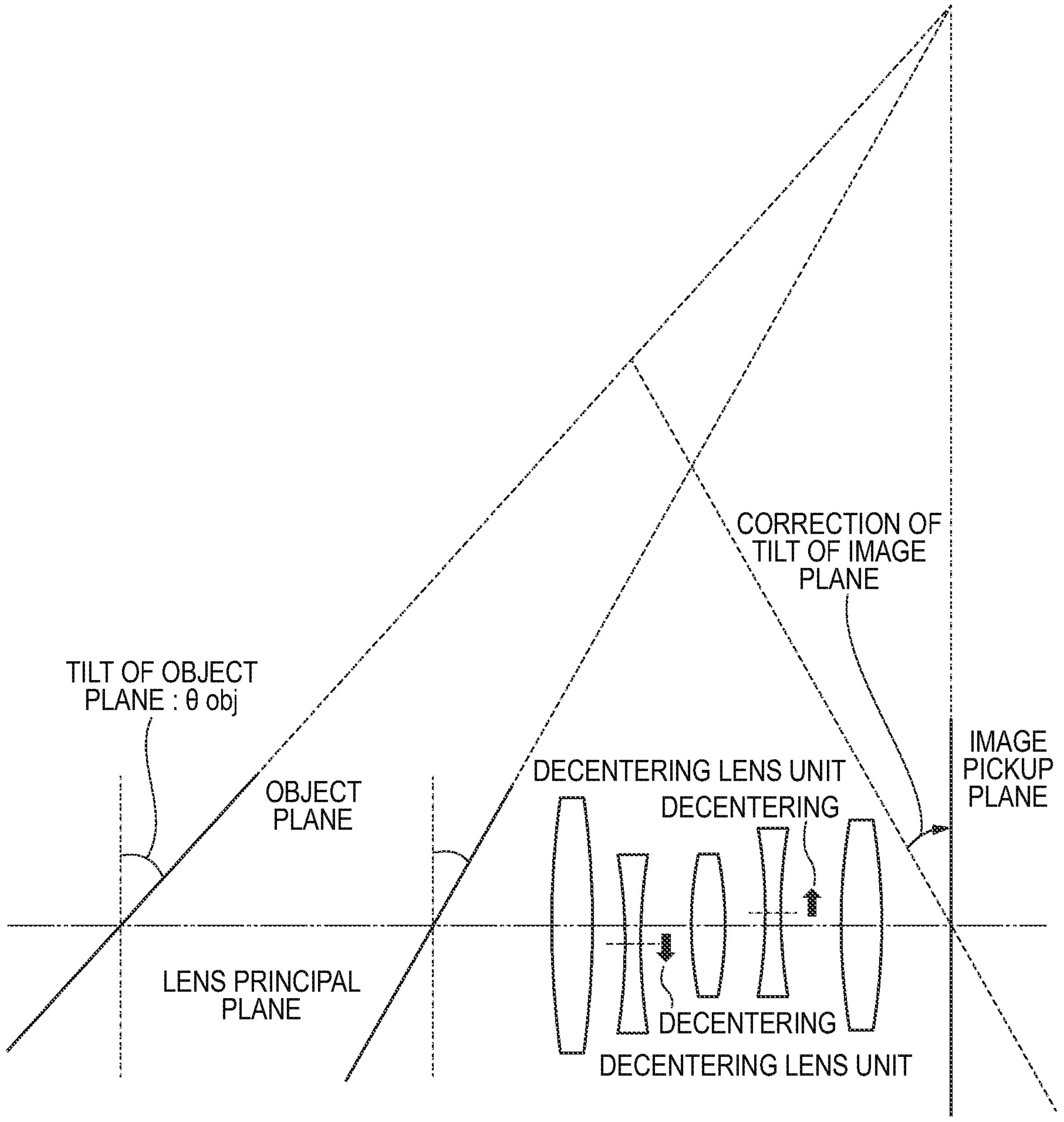
FIG. 24 shows a correction of face tangle by parallel decentering of lens units.

Next, an embodiment of a digital still camera (image pickup apparatus) 10 equipped with an optical system of the disclosure as an image pickup optical system will be described with reference to FIG. 24. In FIG. 24, reference numeral 13 denotes a camera body, and reference numeral 11 denotes an image pickup optical system constituted by an optical system of any of Embodiments 1-7. Reference numeral 12 denotes a solid-state image pickup element (photoelectric conversion device) such as a CCD sensor and a CMOS sensor built in a camera body and configured to receive and convert an optical image formed by an image pickup optical system 11. The camera body 10 may be a so-called single-lens reflex camera having a quick turn mirror or a so-called mirrorless camera having no quick turn mirror.

The image pickup optical system 11 and the camera body 13 may be integrally formed or may be formed in detachably to each other.

Thus, by applying an optical system of the disclosure to an image pickup apparatus such as digital still camera, it is possible to obtain an image pickup apparatus in which the lens is small, the composition shift is small, and a fine tilt image pickup can be performed for an object plane which is tilted from a finite distance to nearly infinity to thereby obtain a good focus.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-191461, filed Nov. 18, 2020, which is hereby incorporated by reference herein in its entirety.

What is claimed is:

1. An optical system comprising:

a first lens unit configured to move to have a component of direction perpendicular to an optical axis;

an intermediate lens unit; and a second lens unit configured to move to have a component of direction perpendicular to the optical axis, wherein the intermediate lens unit is composed of all lenses disposed between the first lens unit and the second lens unit, and the intermediate lens unit is not movable in the direction perpendicular to the optical axis, wherein the first lens unit and the second lens unit are moved in directions different from each other in case where focal lengths of the first lens unit and the second lens unit are same in sign, and the first lens unit and the second lens unit are moved in a same direction in case where the focal lengths of the first lens unit and the second lens unit are different from each other, and wherein the following inequalities are satisfied, $$0.4<|Pa\mathbf{51}+|Pb|<12.0,$$

$$0<Lbk/f<0.65, \text{ and}$$

$$-0.5<fa/fbw<4.0$$

where Pa represents a product of a Petzval sum of the first lens unit and a focal length of the optical system, Pb represents a product of a Petzval sum of the second lens unit and the focal length of the optical system, f represents a focal length of the optical system, Lbk represents a back focus of the optical system, fbw represents a focal length of the intermediate lens unit, and fa represents a focal length of the first lens unit.

2. The optical system according to claim 1, wherein a sign of a product of a decentering aberration coefficient representing a sensitivity of image plane tilt to a parallel decentering of the first lens unit to the optical axis and the amount of movement of the first lens unit is the same as a sign of a product of a decentering aberration coefficient representing a sensitivity of image plane tilt to a parallel decentering of the second lens unit to the optical system and the amount of movement of the second lens unit.

3. The optical system according to claim 1, wherein the following inequality is satisfied, $$0<|(IIIEa\times Sb)-(IIIEb\times Sa)|<6.0$$

where IIIEa represents a decentering aberration coefficient representing astigmatism caused by a parallel decentering of the first lens unit to the optical axis, IIIEb represents a decentering aberration coefficient representing astigmatism caused by a parallel decentering of the second lens unit to the optical axis, Sa represents a decentration sensitivity of the first lens unit, and Sb represents a decentering sensitivity of the second lens unit.

4. The optical system according to claim 1, wherein the following inequality is satisfied, $$0<|(IIEa\times Sb)-(IIEb\times Sa)|<2.5$$

where IIEa represents a decentering aberration coefficient representing a comatic aberration caused by a parallel decentering of the first lens unit to the optical axis, IIEb represents a decentration aberration coefficient representing a comatic aberration caused by a parallel decentering of the second lens unit to the optical axis, Sa represents a decentering sensitivity of the first lens unit, and Sb represents a decentering sensitivity of the second lens unit.

5. The optical system according to claim 1, wherein the following inequality is satisfied, $$0.5<|\mathrm{Pa}|/|Pb|<2.0.$$

6. The optical system according to claim 1, wherein a magnification of the first lens unit and a magnification of the intermediate lens unit are different from each other in sign.

7. The optical system according to claim 1, wherein the following inequality is satisfied, $$0.07<|fa|/f<2.0$$

8. The optical system according to claim 1, wherein the following inequality is satisfied, $$0.07<|fb|/f<2.0$$

where fb represents a focal length of the second lens unit.

9. The optical system according to claim 1, comprising an aperture stop;

wherein the following inequality is satisfied, $$0<|LshA/Lopt|<0.5$$

where Lopt represents a total length of the optical system and LshA represents a length from the aperture stop to a surface of the first lens unit disposed farthest from the aperture stop.

10. The optical system according to claim 1, comprising an aperture stop;

wherein the following inequality is satisfied, $$0<|LshB/Lopt|<0.5$$

where Lopt represents a total length of the optical system and LshB represents a length from the aperture stop to a surface of the second lens unit disposed farthest from aperture stop.

11. The optical system according to claim 1, wherein the following inequality is satisfied, $$0.01<|Ma_{max}|/\varphi a<0.5$$

where φa represents an effective diameter of the first lens unit and $Ma_{max}$ represents a maximum movement amount of the first lens unit in a vertical direction to the optical axis.

12. The optical system according to claim 1, wherein the following inequality is satisfied, $$0.01<|Mb_{max}|/\varphi b<0.5$$

where φb represents an effective diameter of the second lens unit and $Mb_{max}$ represents a maximum movement amount of the second lens unit in a vertical direction to the optical axis.

13. The optical system according to claim 1, wherein the following inequality is satisfied, $$0.5<Lopt/f<3.0$$

where Lopt represents a total length of the optical system.

14. An image pickup lens unit, comprising an optical system and an image pickup element configured to receive an image formed by the optical system, wherein the optical system comprises:

a first lens unit configured to move to have a component of direction perpendicular to an optical axis;

an intermediate lens unit, and a second lens unit configured to move to have a component of direction perpendicular to the optical axis, wherein the intermediate lens unit is composed of all lenses disposed between the first lens unit and the second lens unit, and the intermediate lens unit is not movable in the direction perpendicular to the optical axis, wherein the first lens unit and the second lens unit are moved in directions different from each other in case where focal lengths of the first lens unit and the second lens unit are same in sign, and the first lens unit and the second lens unit are moved in a same direction in case where the focal lengths of the first lens unit and the second lens unit are different from each other, and wherein the following inequalities are satisfied, $$0.4<|Pa|+|Pb|<12.0,$$

$$0<Lbk/f<0.65, \text{ and}$$

$$-0.5<fa/fbw<4.0$$

where Pa represents a product of a Petzval sum of the first lens unit and a focal length of the optical system, Pb represents a product of a Petzval sum of the second lens unit and the focal length of the optical system, f represents a focal length of the optical system, Lbk represents a back focus of the optical system, fbw represents a focal length of the intermediate lens unit, and fa represents a focal length of the first lens unit.

15. The image pickup lens unit according to claim 14, wherein a sign of a product of a decentering aberration coefficient representing a sensitivity of image plane tilt to a parallel decentering of the first lens unit to the optical axis and the amount of movement of the first lens unit is the same as a sign of a product of a decentering aberration coefficient representing a sensitivity of image plane tilt to a parallel decentering of the second lens unit to the optical system and the amount of movement of the second lens unit is the same.

16. The image pickup lens unit according to claim 14, wherein the following inequality is satisfied, $$0<|(IIIEa\times Sb)-(IIIEb\times Sa)|<6.0$$

where IIIEa represents a decentering aberration coefficient representing astigmatism caused by a parallel decentering of the first lens unit to the optical axis, IIIEb represents a decentering aberration coefficient representing astigmatism caused by a parallel decentering of the second lens unit to the optical axis, Sa represents a decentration sensitivity of the first lens unit, and Sb represents a decentering sensitivity of the second lens unit.

17. The image pickup lens unit according to claim 14, wherein the following inequality is satisfied, $$0<|(IIEa\times Sb)-(IIEb\times Sa)|<2.5$$

where IIEa represents a decentering aberration coefficient representing a comatic aberration caused by a parallel decentering of the first lens unit to the optical axis, IIEb represents a decentration aberration coefficient representing a comatic aberration caused by a parallel decentering of the second lens unit to the optical axis, Sa represents a decentering sensitivity of the first lens unit, and Sb represents a decentering sensitivity of the second lens unit.

18. The image pickup lens unit according to claim 14, wherein the following inequality is satisfied, $$0.5<|Pa|/|Pb|<2.0.$$

19. The image pickup lens unit according to claim 14, wherein a magnification of the first lens unit and a magnification of the intermediate lens unit are different from each other in sign.

* * * * *